United States Patent
Yao et al.

(10) Patent No.: US 12,425,305 B2
(45) Date of Patent: Sep. 23, 2025

(54) GROUP CREATION METHOD, APPARATUS, AND SYSTEM

(71) Applicant: Huawei Technologies Co., Ltd., Shenzhen (CN)

(72) Inventors: Qi Yao, Beijing (CN); Qianghua Zhu, Beijing (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 281 days.

(21) Appl. No.: 17/872,281

(22) Filed: Jul. 25, 2022

(65) Prior Publication Data
US 2023/0008666 A1 Jan. 12, 2023

Related U.S. Application Data

(63) Continuation of application No. 17/157,196, filed on Jan. 25, 2021, now Pat. No. 11,432,349, which is a (Continued)

(30) Foreign Application Priority Data

Jul. 26, 2018 (CN) .......................... 201810834596.3

(51) Int. Cl.
*H04W 4/08* (2009.01)
*H04L 41/0893* (2022.01)
(Continued)

(52) U.S. Cl.
CPC ...... *H04L 41/0893* (2013.01); *H04L 41/0895* (2022.05); *H04W 4/08* (2013.01); *H04W 76/11* (2018.02); *H04W 84/12* (2013.01)

(58) Field of Classification Search
CPC ....... H04W 72/048; H04W 4/46; H04W 4/08; H04W 4/44; H04W 4/027; H04W 4/40;
(Continued)

(56) References Cited

U.S. PATENT DOCUMENTS 8,719,427 B2 5/2014 Huang et al.
9,510,166 B1 11/2016 Allen et al.
(Continued)

FOREIGN PATENT DOCUMENTS

CN 101835105 A 9/2010
CN 102130773 A 7/2011
(Continued)

OTHER PUBLICATIONS

Chengshi, G. et al., "A Subjective Trust Model Based on Community in Open Network," Computer Applications and Software, vol. 25, No. 9, Sep. 2008, 3 pages (with English Abstract).
(Continued)

*Primary Examiner* — Cindy Trandai
(74) *Attorney, Agent, or Firm* — SLATER MATSIL, LLP

(57) ABSTRACT

A group creation method, an apparatus, and a system, the method including receiving, by a group management network element on a first network, a group creation request requesting creation of a group for local area network communication, allocating, by the group management network element on the first network, a group identifier to the group, sending, by the group management network element on the first network, the group identifier to a terminal device that is in the group and whose home network is the first network, and sending, by the group management network element on the first network when the group includes a terminal device whose home network is a second network, the group identifier and an identifier of the terminal device that is in the group and whose home network is the second network to a group management network element on the second network.

13 Claims, 10 Drawing Sheets

Related U.S. Application Data continuation of application No. PCT/CN2019/097076, filed on Jul. 22, 2019.

(51) Int. Cl.
  *H04L 41/0895* (2022.01)
  *H04W 76/11* (2018.01)
  *H04W 84/12* (2009.01)

(58) Field of Classification Search
  CPC ....... H04W 76/11; H04W 76/14; H04W 4/70; H04W 4/80; H04W 4/90; H04W 8/186; H04W 88/02; H04L 67/12; H04L 67/1044; H04L 67/1074; H04L 67/303
  See application file for complete search history.

(56) References Cited

U.S. PATENT DOCUMENTS

| | | | | |
|---|---|---|---|---|
| 10,231,113 | B1* | 3/2019 | Huang | H04W 8/04 |
| 10,405,239 | B2* | 9/2019 | Oohira | H04W 8/06 |
| 10,623,920 | B2 | 4/2020 | Futaki | |
| 2008/0008106 | A1* | 1/2008 | Boberg | H04L 12/185 |
| | | | | 370/270 |
| 2008/0233957 | A1 | 9/2008 | Akama | |
| 2010/0027443 | A1 | 2/2010 | LoGalbo et al. | |
| 2010/0146065 | A1 | 6/2010 | Zhu et al. | |
| 2011/0268047 | A1 | 11/2011 | Nath et al. | |
| 2012/0163339 | A1 | 6/2012 | Sung et al. | |
| 2013/0028163 | A1 | 1/2013 | Hsiao et al. | |
| 2013/0136072 | A1 | 5/2013 | Bachmann et al. | |
| 2015/0117298 | A1 | 4/2015 | Hanatani et al. | |
| 2015/0271860 | A1* | 9/2015 | Baghel | H04W 76/14 |
| | | | | 455/552.1 |
| 2016/0007138 | A1* | 1/2016 | Palanisamy | H04L 12/28 |
| | | | | 455/41.2 |
| 2016/0050544 | A1 | 2/2016 | Chandramouli et al. | |
| 2016/0105773 | A1 | 4/2016 | Wawrowski et al. | |
| 2016/0227385 | A1* | 8/2016 | Ahmad | H04L 65/1073 |
| 2016/0309401 | A1 | 10/2016 | Baek et al. | |
| 2017/0111096 | A1 | 4/2017 | Nabetani et al. | |
| 2017/0265018 | A1 | 9/2017 | Mok et al. | |
| 2017/0339534 | A1* | 11/2017 | Bhalla | H04W 4/08 |
| 2018/0027393 | A1 | 1/2018 | Yang et al. | |
| 2018/0139247 | A1* | 5/2018 | Lin | H04L 51/04 |
| 2019/0082326 | A1* | 3/2019 | Mathison | H04W 8/18 |
| 2019/0159018 | A1* | 5/2019 | Basu Mallick | H04W 8/005 |
| 2019/0159117 | A1* | 5/2019 | Kuge | H04W 8/08 |
| 2019/0166467 | A1 | 5/2019 | Livanos | H04W 8/186 |
| 2019/0261260 | A1* | 8/2019 | Dao | H04W 48/00 |
| 2020/0021451 | A1 | 1/2020 | Pinheiro et al. | |
| 2021/0084460 | A1 | 3/2021 | Yang et al. | |
| 2021/0211861 | A1* | 7/2021 | Ramle | H04W 60/06 |
| 2021/0258769 | A1* | 8/2021 | Kim | H04W 8/14 |
| 2022/0248225 | A1* | 8/2022 | Bykampadi | H04L 9/3213 |

FOREIGN PATENT DOCUMENTS

| | | |
|---|---|---|
| CN | 104041086 A | 9/2014 |
| CN | 104093132 A | 10/2014 |
| CN | 104753877 A | 7/2015 |
| CN | 106255074 A | 12/2016 |
| CN | 106888437 A | 6/2017 |
| CN | 107635227 A | 1/2018 |
| EP | 3021604 A1 | 5/2016 |
| WO | 03039173 A1 | 5/2003 |

OTHER PUBLICATIONS

"Key Issue Proposal on 5GLAN Group Management," Source: Huawei, HiSilicon, KPN, Intel, Document for: Discussion and approval, Agenda Item: 6.15, Work Item / Release: FS_Vertical LAN / Rel-16, SA WG2 Meeting #128, SA WG2 Temporary Document, S2-187550, Jul. 2-6, 2018, Vilnius, Lithuania, 3 pages.

* cited by examiner

GROUP CREATION METHOD, APPARATUS, AND SYSTEM

CROSS-REFERENCE TO RELATED APPLICATIONS

This application is a continuation of U.S. patent application Ser. No. 17/157,196, filed on Jan. 25, 2021, which is a continuation of International Application No. PCT/CN2019/097076, filed on Jul. 22, 2019, which claims priority to Chinese Patent Application No. 201810834596.3, filed on Jul. 26, 2018. All of the afore-mentioned patent applications are hereby incorporated by reference in their entireties.

TECHNICAL FIELD

This application relates to the field of communications technologies, and in particular, to a group creation method, an apparatus, and a system.

BACKGROUND

A conventional local area network (LAN) is a communications network formed by interconnecting terminal devices, databases, servers, and the like in a specific area (which is usually a relatively small geographical range). Based on the local area network, functions such as file management and software sharing may be implemented between the terminal devices. Local area network communication has advantages of high data transmission efficiency and a low bit error rate, but a coverage area of the local area network is usually relatively small. For example, one local area network usually can cover only one company or one campus.

With emergence of various new enterprise office modes and smart home modes, the conventional local area network no longer meets various requirements posed by the prior art due to disadvantages in aspects such as flexibility, mobility, and a coverage area. Currently, a new mobile local area network is urgently needed to meet new requirements posed by technology development to the local area network.

SUMMARY

This application provides a group creation method, an apparatus, and a system, to propose a new networking manner of a mobile local area network.

According to a first aspect, an embodiment of this application provides a group creation method. The method includes, first, that a group management network element on a first network receives a group creation request, where the group creation request is used to request to create a group for performing local area network communication, and the group creation request includes an identifier of each terminal device in the group. Then the group management network element on the first network allocates a group identifier to the group, and after allocating the group identifier, sends the group identifier to a terminal device that is in the group and whose home network is the first network. If the group includes a terminal device whose home network is a second network, the group management network element on the first network may first determine a group management network element on the second network, and then send, to the group management network element on the second network, the group identifier and an identifier of the terminal device that is in the group and whose home network is the second network.

According to the foregoing method, a group management network element is disposed on each network, and the group management network element on the first network and the group management network element on the second network may collaborate with each other, to create the group for the terminal device that belongs to the first network and the terminal device that belongs to the second network. In this way, a terminal device in the group may perform local area network communication based on the group. The group created in this manner can be no longer limited to a geographical location, and the group creation method is also more flexible and efficient.

In a possible design, the group management network element on the first network may receive the group creation request in the following two manners.

Manner 1: The group management network element on the first network receives the group creation request that is from a first terminal device, where a home network of the first terminal device is the first network.

Manner 2: The group management network element on the first network receives the group creation request that is from a first application network element.

According to the foregoing method, an initiator of the group creation request may be a terminal device, or may be an application network element, so that the group creation method is applicable to different application scenarios, and application scenarios are more extensive.

In a possible design, before allocating the group identifier to the group, the group management network element on the first network may further determine whether the first terminal device or the first application network element has a permission to request to create the group, and the group management network element on the first network allocates the group identifier to the group after determining that the first terminal device or the first application network element has the permission to request to create the group.

According to the foregoing method, before the group identifier is allocated, it needs to be determined whether the initiator of the group creation request has a permission to request to create the group. This can ensure that the group is created in an orderly manner, thereby avoiding disorder caused by requesting, by a plurality of initiators, to create the group, and further ensuring that the group can be created efficiently.

In a possible design, there are many manners of determining, by the group management network element on the first network, that the first terminal device has the permission to request to create the group. For example, the group management network element on the first network may determine, based on authentication information of the first terminal device, that the first terminal device has the permission to request to create the group. That is, the authentication information of the first terminal device includes information used to indicate that the first terminal device has the permission to request to create the group.

The authentication information of the first terminal device may be locally stored on the group management network element on the first network. Alternatively, the authentication information of the first terminal device may be stored on a unified data management network element on the first network as a part of subscription data of the first terminal device. When the group management network element on the first network needs to determine that the first terminal device has the permission to request to create the group, the group management network element on the first network may obtain the authentication information of the first terminal device from the unified data management network element on the first network, and then determine, based on the obtained authentication information of the first terminal device, that the first terminal device has the permission to request to create the group.

According to the foregoing method, the group management network element on the first network determines, by using the authentication information specific to the first terminal device, that the first terminal device has the permission to request to create the group. This is more convenient and simpler, and can further improve flexibility of the group creation method and creation efficiency.

In a possible design, when receiving the group creation request that is from the first terminal device, the group management network element on the first network may receive, from an access and mobility management network element, the group creation request that is from the first terminal device, and when sending the group creation request, the first terminal device may first send the group creation request to the access and mobility management network element, and then the access and mobility management network element forwards the group creation request to the group management network element on the first network.

According to the foregoing method, the access and mobility management network element forwards the group creation request that is from the first terminal device to the group management network element on the first network, so that the group creation request can be accurately and promptly sent to the group management network element on the first network, thereby further improving efficiency of the group creation method.

In a possible design, there are many methods for determining, by the group management network element on the first network, the group management network element on the second network. The group management network element on the first network may determine the group management network element on the second network based on locally stored information. Alternatively, the group management network element on the first network may determine to query the group management network element on the second network from a specific network element or server, for example, a domain name system (DNS) or a network repository function (NRF) network element. Alternatively, the group management network element on the first network may determine the group management network element on the second network by using the access and mobility management network element. Specifically, the access and mobility management network element may determine the group management network element on the second network, and then the access and mobility management network element sends related information of the group management network element on the second network to the group management network element on the first network.

According to the foregoing method, the group management network element on the first network may determine the group management network element on the second network by using the access and mobility management network element, and the group management network element on the first network collaborates with the access and mobility management network element, so that group creation efficiency can be improved.

In a possible design, after allocating the group identifier, the group management network element on the first network needs to store the group identifier and send the group identifier to the terminal device that is in the group and whose home network is the first network, and the group management network element on the first network may store the group identifier on the unified data management network element on the first network, and may further send, by using the unified data management network element on the first network, the group identifier to the terminal device that is in the group and whose home network is the first network.

According to the foregoing method, the group identifier may be effectively stored on the unified data management network element on the first network, so that effective storage of the group identifier and successful creation of the group can be ensured, and the unified data management network element on the first network sends the group identifier to the terminal device that is in the group and whose home network is the first network, so that successful creation of the group can also be ensured, and the terminal device can subsequently perform local area network communication based on the group.

In a possible design, when sending, by using the unified data management network element on the first network, the group identifier to the terminal device that is in the group and whose home network is the first network, the group management network element on the first network may send, to the unified data management network element on the first network, a first message used to trigger sending the group identifier to the terminal device that is in the group and whose home network is the first network, where the first message includes the group identifier and an identifier of the terminal device that is in the group and whose home network is the first network.

According to the foregoing method, a manner of sending a message may be used to notify the unified data management network element on the first network to send the group identifier. This can ensure that the terminal device can receive the group identifier, and further ensure successful creation of the group, so that the terminal device can subsequently perform local area network communication based on the group.

According to a second aspect, an embodiment of this application provides a group creation method. The method includes, first, a unified data management network element on a first network receives a first request that is from a group management network element on the first network and that is used to request authentication information of a first terminal device. After determining the authentication information of the first terminal device, the unified data management network element on the first network sends a response message for the first request to the group management network element on the first network, where the response message for the first request includes the authentication information of the first terminal device, and the authentication information includes information used to indicate whether the first terminal device has a permission to request to create a group.

According to the foregoing method, the information used to indicate that the first terminal device has the permission to request to create the group is stored on the unified data management network element on the first network. This can ensure security of the information used to indicate that the first terminal device has the permission to request to create the group. In addition, when it is determined that the first terminal device has the permission to request to create the group, the authentication information of the first terminal device needs to be obtained from the unified data management network element on the first network. This can ensure that a result of determining that the first terminal device has the permission to request to create the group is accurate and effective, and can further ensure successful creation of the group.

In a possible design, the unified data management network element on the first network may receive a first message that is from the group management network element on the first network and that is used to trigger sending a group identifier to a terminal device that is in the group and whose home network is the first network, where the first message includes the group identifier and an identifier of a terminal device that is in the group and whose home network is the first network, and after receiving the first message, separately update the group identifier into subscription data of a corresponding terminal device based on the identifier of the terminal device that is in the group and whose home network is the first network.

According to the foregoing method, after receiving the first message, the unified data management network element on the first network may store the group identifier and update the group identifier into subscription data of each corresponding terminal device. This can ensure information security and long-term validity of the group identifier, and can further ensure successful creation of the group.

In a possible design, after receiving the first message, the unified data management network element on the first network may further send the group identifier to the corresponding terminal device based on the identifier of the terminal device that is in the group and whose home network is the first network.

According to the foregoing method, after receiving the first message, the unified data management network element on the first network can send the group identifier to the corresponding terminal device, so that each terminal device can finally obtain the group identifier, and can subsequently perform effective local area network communication based on the group.

In a possible design, when the unified data management network element on the first network sends the group identifier to the corresponding terminal device based on the identifier of the terminal device that is in the group and whose home network is the first network, for any terminal device that is in the group and whose home network is the first network, there may be the following two cases depending on whether the terminal device is registered with the first network.

Case 1: If the terminal device is registered with the first network, the unified data management network element on the first network sends the group identifier to an access and mobility management network element by using a subscription data update notification message, and then the access and mobility management network element sends the subscription data update notification message carrying the group identifier to the terminal device, where the subscription data update notification message includes the group identifier.

Case 2: If the terminal device is not registered with the first network, in a registration process of the terminal device, the unified data management network element on the first network sends the group identifier to an access and mobility management network element as a part of subscription data of the terminal device, and then the access and mobility management network element adds the group identifier to a registration accept message and sends the registration accept message to the terminal device.

According to the foregoing method, it can be ensured that a corresponding method may be used regardless of whether the terminal device is registered with the first network, and the terminal device receives the group identifier, and may subsequently perform effective local area network communication based on the group.

According to a third aspect, an embodiment of this application provides a group creation method. The method includes, first, that a global group management network element receives a group creation request, where the group creation request is used to request to create a group for performing local area network communication, and the group creation request includes an identifier of each terminal device in the group. Then the global group management network element allocates a group identifier to the group. After allocating the group identifier, the global group management network element needs to notify the group identifier to each terminal device in the group, and the global group management network element may determine a home network of each terminal device in the group, and determine a group management network element on the home network. For any home network, the global group management network element sends, to the group management network element on the home network, the group identifier and an identifier of a terminal device that is in the group and that is on the home network.

According to the foregoing method, the global group management network element performs the operation of allocating the group identifier to the group, and then a group management network element on each home network sends the group identifier to a terminal device that is in the group and that belongs to a corresponding network, so that the group can be created for terminal devices on different networks. In addition, a group creation manner is flexible and efficient, and is not limited to a geographical location, so that a comparatively large geographical range can be covered.

In a possible design, the group creation request may be from a first terminal device, or may be from a first application network element. The first terminal device may be any terminal device in the group, or may not be a terminal device in the group, but only act as an initiator of the group creation request.

According to the foregoing method, an initiator of the group creation request may be a terminal device, or may be an application network element, so that the group creation method is applicable to different application scenarios, and application scenarios are more extensive.

In a possible design, before allocating the group identifier to the group, the global group management network element may further determine whether the first terminal device or the first application network element has a permission to request to create the group, and allocate the group identifier after determining that the first terminal device or the first application network element has the permission to request to create the group.

According to the foregoing method, before allocating the group identifier, the global group management network element first determines whether the initiator of the group creation request has a permission to request to create the group. This can ensure an orderly group creation process, thereby avoiding disorder caused by simultaneously requesting, by a plurality of initiators, to create the group, and ensuring that the group can be created efficiently.

In a possible design, there are many manners of determining, by the global group management network element, that the first terminal device has the permission to request to create the group. For example, the global group management network element may determine, based on authentication information of the first terminal device, that the first terminal device has the permission to request to create the group. That is, the authentication information of the first terminal device includes information used to indicate that the first terminal device has the permission to request to create the group.

The authentication information of the first terminal device may be locally stored on the global group management network element, or may be stored on a unified data management network element as a part of subscription data of the first terminal device. When the global group management network element needs to determine that the first terminal device has the permission to request to create the group, the global group management network element may obtain the authentication information of the first terminal device from the unified data management network element, and then determine, based on the obtained authentication information of the first terminal device, that the first terminal device has the permission to request to create the group.

According to the foregoing method, the global group management network element may determine, in a secure and simple manner by using the authentication information of the first terminal device, that the first terminal device has the permission to request to create the group. This can further improve flexibility of the group creation method and creation efficiency.

According to a fourth aspect, an embodiment of this application further provides a communications apparatus. The communications apparatus is applied to a group management network element on a first network. For beneficial effects, refer to the descriptions in the first aspect. Details are not described herein again. The apparatus has a function of implementing the behavior in the method example in the first aspect. The function may be implemented by hardware, or may be implemented by hardware executing corresponding software. The hardware or software includes one or more modules corresponding to the function. In a possible design, a structure of the apparatus includes a receiving unit, a processing unit, and a sending unit. These units may perform corresponding functions in the method example in the first aspect. For details, refer to the detailed descriptions in the method example. Details are not described herein again.

According to a fifth aspect, an embodiment of this application further provides a communications apparatus. The communications apparatus is applied to a unified data management network element on a first network. For beneficial effects, refer to the descriptions in the second aspect. Details are not described herein again. The apparatus has a function of implementing the behavior in the method example in the second aspect. The function may be implemented by hardware, or may be implemented by hardware executing corresponding software. The hardware or software includes one or more modules corresponding to the function. In a possible design, a structure of the apparatus includes a receiving unit and a sending unit, and may further include a processing unit. These units may perform corresponding functions in the method example in the second aspect. For details, refer to the detailed descriptions in the method example. Details are not described herein again.

According to a sixth aspect, an embodiment of this application further provides a communications apparatus. The communications apparatus is applied to a global group management network element. For beneficial effects, refer to the descriptions in the third aspect. Details are not described herein again. The apparatus has a function of implementing the behavior in the method example in the third aspect. The function may be implemented by hardware, or may be implemented by hardware executing corresponding software. The hardware or software includes one or more modules corresponding to the function. In a possible design, a structure of the apparatus includes a receiving unit, a processing unit, and a sending unit. These units may perform corresponding functions in the method example in the third aspect. For details, refer to the detailed descriptions in the method example. Details are not described herein again.

According to a seventh aspect, an embodiment of this application further provides a communications apparatus. The communications apparatus is applied to a group management network element on a first network. For beneficial effects, refer to the descriptions in the first aspect. Details are not described herein again. A structure of the communications apparatus includes a processor and a memory. The processor is configured to support the terminal device in performing a corresponding function in the method in the first aspect. The memory is coupled to the processor, and stores a program instruction and data that are necessary for the communication apparatus. The structure of the communications apparatus further includes a communications interface, configured to communicate with another device.

According to an eighth aspect, an embodiment of this application further provides a communications apparatus. The communications apparatus is applied to a unified data management network element on a first network. For beneficial effects, refer to the descriptions in the second aspect. Details are not described herein again. A structure of the communications apparatus includes a processor and a memory. The processor is configured to support the terminal device in performing a corresponding function in the method in the second aspect. The memory is coupled to the processor, and stores a program instruction and data that are necessary for the communication apparatus. The structure of the communications apparatus further includes a communications interface, configured to communicate with another device.

According to a ninth aspect, an embodiment of this application further provides a communications apparatus. The communications apparatus is applied to a global group management network element. For beneficial effects, refer to the descriptions in the third aspect. Details are not described herein again. A structure of the communications apparatus includes a processor and a memory. The processor is configured to support the terminal device in performing a corresponding function in the method in the third aspect. The memory is coupled to the processor, and stores a program instruction and data that are necessary for the communication apparatus. The structure of the communications apparatus further includes a communications interface, configured to communicate with another device.

According to a tenth aspect, an embodiment of this application further provides a communications system. For beneficial effects, refer to the descriptions in the foregoing aspects. Details are not described herein again. The communications system includes a group management network element on a first network and a unified data management network element on the first network.

The group management network element on the first network is configured to after receiving a group creation request that is from a first terminal device, send, to the unified data management network element on the first network, a first request used to request authentication information of the first terminal device, where the group creation request is used to request to create a group for performing local area network communication, and the group creation request includes an identifier of each terminal device in the group.

The unified data management network element on the first network is configured to receive the first request, and send a response message for the first request to the group management network element on the first network, where the response message for the first request includes the authentication information of the first terminal device, and the authentication information includes information used to indicate whether the first terminal device has a permission to request to create the group.

The group management network element on the first network is further configured to receive the response message for the first request, determine, based on the authentication information of the first terminal device, that the first terminal device has the permission to request to create the group, and allocate a group identifier to the group.

In a possible design, the group management network element on the first network is further configured to send, to the unified data management network element on the first network, a first message used to trigger sending the group identifier to a terminal device that is in the group and whose home network is the first network, where the first message includes the group identifier and an identifier of the terminal device that is in the group and whose home network is the first network.

The unified data management network element on the first network is further configured to receive the first message, and separately update the group identifier into subscription data of a corresponding terminal device based on the identifier of the terminal device that is in the group and whose home network is the first network.

In a possible design, after receiving the first message, the unified data management network element on the first network may further send the group identifier to the corresponding terminal device based on the identifier of the terminal device that is in the group and whose home network is the first network.

In a possible design, when the unified data management network element on the first network sends the group identifier to the corresponding terminal device based on the identifier of the terminal device that is in the group and whose home network is the first network, for any terminal device that is in the group and whose home network is the first network, depending on whether the terminal device is registered with a corresponding home network, the group identifier may be sent in the following two manners.

Manner 1: If the terminal device is registered with the first network, the unified data management network element on the first network sends the group identifier to an access and mobility management network element by using a subscription data update notification message, and then the access and mobility management network element sends the subscription data update notification message carrying the group identifier to the terminal device, where the subscription data update notification message includes the group identifier.

Manner 2: If the terminal device is not registered with the first network, in a registration process of the terminal device, the unified data management network element on the first network sends the group identifier to an access and mobility management network element as a part of subscription data of the terminal device.

In a possible design, the communications system may further include a group management network element on a second network. When the group includes a terminal device whose home network is the second network, the group management network element on the first network may send, to the group management network element on the second network, the group identifier and an identifier of the terminal device that is in the group and whose home network is the second network.

After receiving, from the group management network element on the first network, the group identifier and the identifier of the terminal device that is in the group and whose home network is the second network, the group management network element on the second network may send the group identifier to the terminal device that is in the group and whose home network is the second network.

According to an eleventh aspect, this application further provides a computer-readable storage medium. The computer-readable storage medium stores an instruction. When the instruction runs on a computer, the computer is enabled to perform the methods in the foregoing aspects.

According to a twelfth aspect, this application further provides a computer program product including an instruction. When the computer program product runs on a computer, the computer is enabled to perform the methods in the foregoing aspects.

According to a thirteenth aspect, this application further provides a computer chip. The chip is connected to a memory, and the chip is configured to read and execute a software program stored in the memory, to perform the methods in the foregoing aspects.

DETAILED DESCRIPTION OF ILLUSTRATIVE EMBODIMENTS

This application provides a group creation method and an apparatus, to propose a new networking manner of a local area network.

To make the objectives, technical solutions, and advantages of the embodiments of this application clearer, the following further describes the embodiments of this application in detail with reference to the accompanying drawings.

Figure 1A:
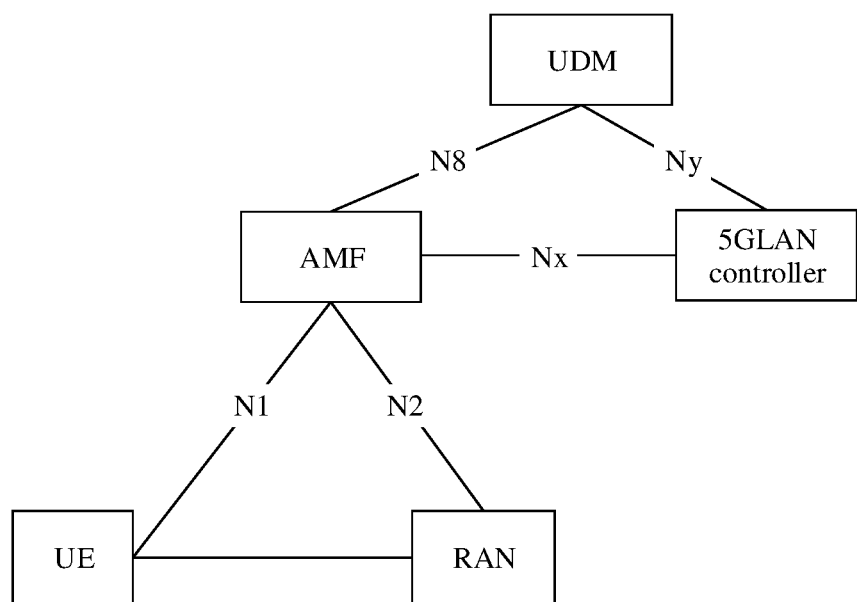
FIG. 1A to FIG. 1C are schematic architectural diagrams of a network system according to this application.

FIG. 1A is a schematic diagram of a network architecture of a network system to which this application is applicable. The network architecture is a network architecture on a public land mobile network (PLMN). The network architecture includes a terminal device, a radio access network (RAN), an access and mobility management function (AMF) network element, a session management function (SMF) network element, a unified data management (UDM) network element, a mobile local area network control controller (5GLAN Controller), and the like.

A main function of the RAN is to control a user to wirelessly access a mobile communications network. The RAN is a part of a mobile communications system, and implements a radio access technology. Conceptually, the RAN resides between a device (for example, a mobile phone, a computer, or any remote controller) and a core network, and provides a connection between the device and the core network.

The AMF network element is responsible for access management and mobility management for the terminal device, for example, registration management, connection management, mobility management, and reachability management. In actual application, the AMF network element includes a mobility management function in a mobility management entity (MME) in an LTE network framework, and adds an access management function. In this embodiment of this application, the AMF network element may send a group creation request that is from the terminal device to the 5GLAN controller, or may determine a home network of each terminal device in a group and a 5GLAN controller on each home network based on an identifier of each terminal device in the group creation request that is from the terminal device. The AMF network element may further notify related information of the determined 5GLAN controller on each home network to a 5GLAN controller on a network on which the AMF network element is currently located.

The UDM network element may store subscription data of a user, and an implementation is similar to that of an HSS in 4G. In this embodiment of this application, a group identifier may be stored on the UDM network element as subscription data of each terminal device in the group. For example, if a group identifier Group 1 is recorded in subscription data of UE, it may indicate that the UE belongs to a group indicated by the Group 1.

The terminal device in this application may also be referred to as user equipment (UE), and may be deployed on land, including an indoor or outdoor scenario and a handheld or in-vehicle scenario, or may be deployed on water (for example, on a steamship), or may be deployed in the air (for example, on an airplane, a balloon, or a satellite). The terminal device may be a mobile phone, a tablet computer, a computer with a radio sending/receiving function, a virtual reality (VR) device, an augmented reality (AR) device, a wireless device in industrial control, a wireless device in self driving, a wireless device in remote medical, a wireless device on a smart grid, a wireless device in transportation safety, a wireless device in a smart city, a wireless device in a smart home, or the like.

The 5GLAN controller is configured to establish a group for a plurality of terminal devices, so that the plurality of terminal devices can perform local area network communication based on the group. In a group creation process, the 5GLAN controller may allocate a group identifier to the group, and send the group identifier to a terminal device that is in the group and that is on a same network as a network on which the 5GLAN controller is located. For a terminal device that is in the group and whose home network is different from the network on which the 5GLAN controller is located, the 5GLAN controller may determine a 5GLAN controller on the home network of the terminal device, and send the group identifier and an identifier of the terminal device to the determined 5GLAN controller on the home network of the terminal device. It should be noted that the 5GLAN controller may be an entity network element, or may be a virtual network element. When the 5GLAN controller is a virtual network element, a logical function of the 5GLAN controller may be integrated into another network element, for example, the SMF network element, and the SMF network element performs a group creation method provided in the embodiments of this application.

Although not shown, the network architecture in FIG. 1A may further include an application function (AF) network element and a network exposure function (NEF) network element.

The AF network element may be an application control platform of a third party, or may be a device of an operator. The AF network element may serve a plurality of application servers. In this embodiment of this application, the AF network element may send the group creation request by using the NEF network element.

The NEF network element exposes a capability and an event of another network element to a third-party partner or the AF network element. The NEF network element provides the AF network element with a method for securely providing information for a 3rd generation partnership project (3GPP) network, and the NEF network element may perform verification and authorization and assist in restricting the AF network element. In addition, the NEF network element may further convert information exchanged by the AF network element and information exchanged by a core network function network element.

Figure 1B:
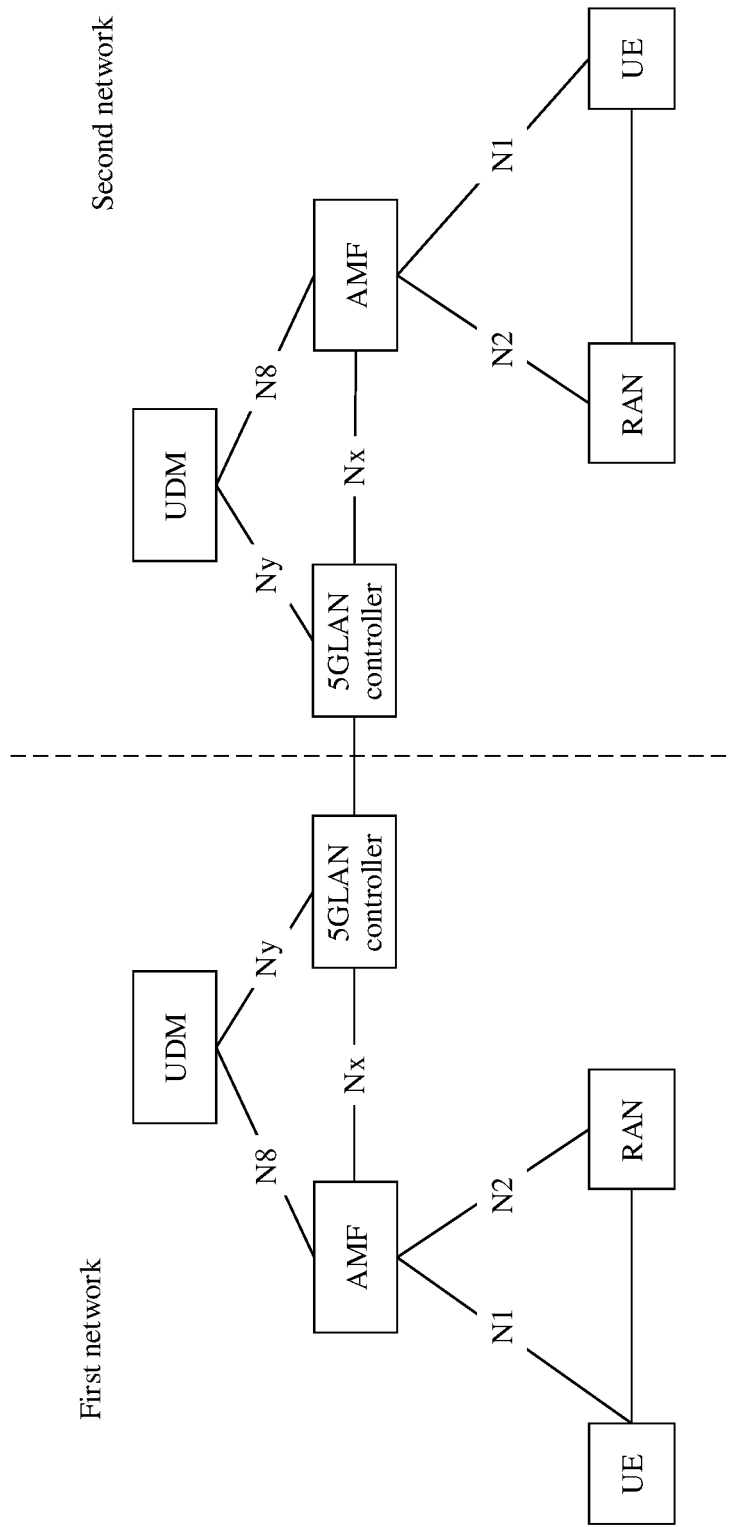

FIG. 1B is a schematic diagram of another possible network architecture to which this application is applicable. If home networks of terminal devices in a created group are different networks, for example, home networks of some terminal devices in the group are a first network, and home networks of some terminal devices in the group are a second network, the group needs to be created through collaboration of 5GLAN controllers on the networks. In FIG. 1B, that the network framework includes network systems of two networks (separately denoted as a first network and a second network) is used as an example. A 5GLAN controller on the first network and a 5GLAN controller on the second network are connected to each other and may perform data transmission. It should be noted that a quantity of networks is not limited in this embodiment of this application, that is, the network architecture may include a plurality of network systems. For example, when home networks of terminal devices in the group are different, and correspondingly, a plurality of different home networks exist, 5GLAN controllers on the plurality of home networks need to collaborate with each other to create the group, and the 5GLAN controllers on the home networks are connected to each other and may perform data transmission.

Functions of network elements in FIG. 1B are similar to functions of the network elements in FIG. 1A. For details, refer to related descriptions in FIG. 1A. Details are not described herein again.

In the network architecture shown in FIG. 1B, when a terminal device on the first network sends a group creation request to a 5GLAN controller on the first network, the 5GLAN controller on the first network may allocate a group identifier to a group. If the group includes a terminal device whose home network is the second network, the 5GLAN controller on the first network may send, to a 5GLAN controller on the second network, the group identifier and an identifier of the terminal device that is in the group and whose home network is the second network. The 5GLAN controller on the second network may send the group identifier to a corresponding terminal device based on the identifier of the terminal device that is included in the group and whose home network is the second network.

Correspondingly, when a terminal device on the second network sends a group creation request to the 5GLAN controller on the second network, the 5GLAN controller on the second network may allocate a group identifier to a group, and send, to the 5GLAN controller on the first network, the group identifier and an identifier of a terminal device that is in the group and whose home network is the first network. A specific process is similar to an operation performed by the 5GLAN controller on the first network when the terminal device on the first network sends the group creation request to the 5GLAN controller on the first network. Details are not described herein again.

In this embodiment of this application, a feature of wide coverage of a mobile network is used. A 5GLAN controller is disposed on each network, and a group may be created for terminal devices that belong to different networks through collaboration between 5GLAN controllers on the networks. In this way, a terminal device in the group can perform local area network communication based on the group, so that the created group can be no longer limited to a geographical location, and a group creation method is more flexible and efficient. Finally, a group creation manner can meet requirements of high flexibility, high mobility, and a wide coverage area.

Figure 1C:
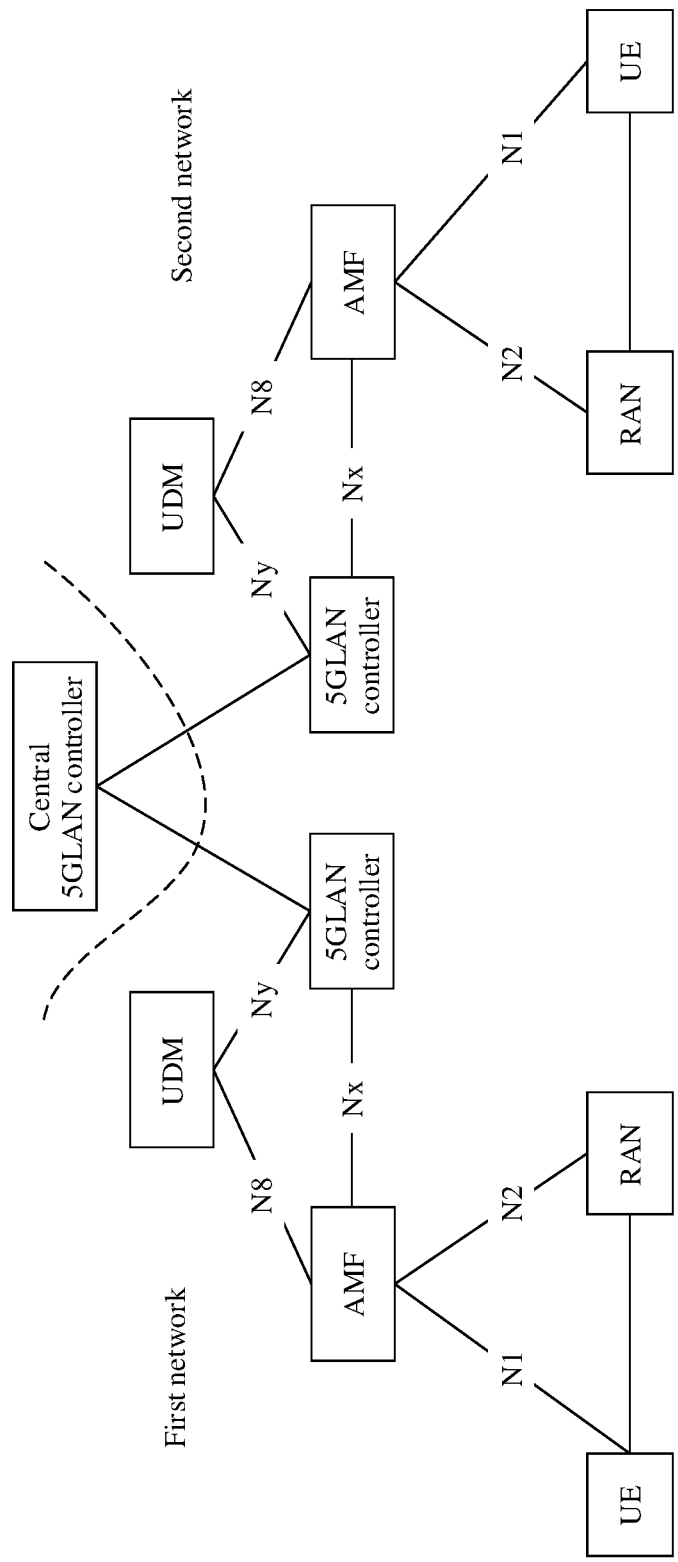

FIG. 1C is a schematic diagram of another possible network architecture to which this application is applicable. The network framework may include network systems of a plurality of networks and a central 5GLAN controller connected to a 5GLAN controller on each network. The central 5GLAN controller is responsible for global 5GLAN management, and the central 5GLAN controller may also be referred to as a global 5GLAN controller, or may have another name. A name of the central 5GLAN controller is not limited in this embodiment of this application.

As shown in FIG. 1C, that network systems of two networks (separately denoted as a first network and a second network) are included is used as an example for description. In the network framework shown in FIG. 1C, the central 5GLAN controller is configured to create a group for a plurality of terminal devices, so that the plurality of terminal devices can perform local area network communication based on the group. In a group creation process, the central 5GLAN controller receives a group creation request that is from a terminal device or an application network element, and may further allocate a group identifier to the group. The central 5GLAN controller is connected to the 5GLAN controller on each network, and may send, to a 5GLAN controller on a corresponding network, the group identifier and an identifier of a terminal device that is in the group and that belongs to each network.

The 5GLAN controller on each network may send the group identifier to a terminal device that is in the group and whose home network is the network.

In the network architecture shown in FIG. 1C, the 5GLAN controller on each network may not allocate a group identifier to the group, but the central 5GLAN controller performs the operation of allocating the group identifier to the group, and then the 5GLAN controller on each network sends the group identifier to a terminal device that is in the group and that belongs to a corresponding network, so that the group can also be created for terminal devices on different networks. In addition, a group creation manner is flexible and efficient, and is not limited to a geographical location, so that a comparatively large geographical range can be covered. In this way, the group creation manner can achieve advantages of high flexibility, high mobility, and a wide coverage area.

In the description of this application, unless otherwise stated, "multiple" means two or more than two. In addition, it should be understood that, in the descriptions of the embodiments of this application, the terms such as "first" and "second" are merely intended for a purpose of differentiated description, and shall not be understood as an indication or an implication of relative importance, or an indication or an implication of a sequence. A name of a group management network element is not limited in the embodiments of this application. In different network frameworks, the group management network element or a global group management network element may have different names. Any network element for performing the group creation method provided in the embodiments of this application may act as the group management network element or the global group management network element. In this application, an example in which the group management network element is a 5GLAN controller and the global group management network element is the central 5GLAN controller is merely used for description. When the group management network element or the global group management network element is another network element, the group creation method provided in this application is also applicable.

Figure 2:
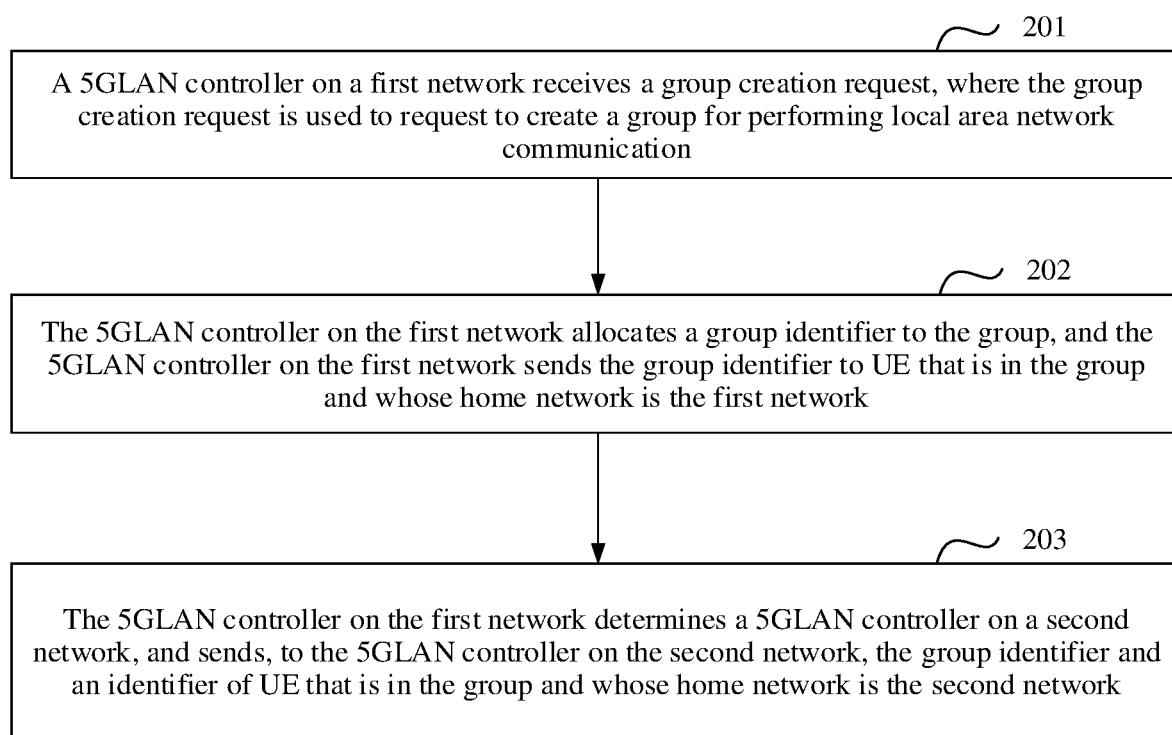
FIG. 2 is a schematic diagram of a group creation method according to this application.

Based on the network frameworks shown in FIG. 1A and FIG. 1B, this application provides a group creation method, where a group management network element is a 5GLAN controller, a terminal device is UE, a unified data management network element is a UDM network element, an access and mobility management network element is an AMF network element, and a first application network element is a first AF network element. As shown in FIG. 2, the method includes the following steps.

Step 201: A 5GLAN controller on a first network receives a group creation request, where the group creation request is used to request to create a group for performing local area network communication, and the group creation request includes an identifier of each UE in the group.

In a possible implementation, the group creation request may be from a first UE, and a home network of the first UE is the first network. In other words, the first UE sends the group creation request to the 5GLAN controller on the first network.

Specifically, the first UE may first send the group creation request to the AMF network element, after receiving the group creation request, the AMF network element determines the 5GLAN controller on the first network, the AMF network element forwards the group creation request to the 5GLAN controller on the first network, and when there are a plurality of 5GLAN controllers on the first network, the AMF network element determines one 5GLAN controller in the plurality of 5GLAN controllers, and then forwards the group creation request to the determined 5GLAN controller. There are many manners of determining, by the AMF network element, the 5GLAN controller on the first network. For example, the AMF network element stores address information of the 5GLAN controller on the first network, and after receiving the group creation request, the AMF network element may send the group creation request to the 5GLAN controller on the first network based on the address information of the 5GLAN controller on the first network. A manner of determining, by the AMF network element, the 5GLAN controller on the first network is not limited in this application.

There are many scenarios in which the first UE sends the group creation request. For example, in an internet of vehicles scenario, vehicles in a vehicle fleet need to communicate with each other, to negotiate on a driving route, a driving speed, and the like at any time. A lead vehicle in the vehicle fleet may send a group creation request, to request to create a group for the vehicles in the vehicle fleet to perform local area network communication. For another example, in an application scenario of smart household appliances, when smart household appliances in a home need to synchronize data or transmit information, one of the smart household appliances may send the group creation request, to request to create a group for all the smart household appliances in the home to perform local area network communication, so that data can be transmitted between the smart household appliances. The foregoing two scenarios are merely examples for description. Actually, the group creation request provided in this embodiment of this application is not limited to the foregoing two scenarios, and may be further applied to another scenario. This is not limited in this embodiment of this application.

In another possible implementation, the group creation request may alternatively be from the first AF network element. In other words, the first AF network element may send the group creation request to the 5GLAN controller on the first network.

Specifically, the first AF network element may send the group creation request to an NEF network element, and after receiving the group creation request, the NEF network element determines the 5GLAN controller on the first network, and forwards the group creation request to the 5GLAN controller on the first network. For a manner of determining, by the NEF network element, the 5GLAN controller on the first network, refer to the manner of determining, by the AMF network element, the 5GLAN controller on the first network. This is not limited in this application.

A scenario in which the first AF network element sends the group creation request is similar to the scenario in which the first UE sends the group creation request, and a difference lies in that UE may first send, to the first AF network element by using an application (APP) or a web page portal that is related to an application scenario, a message used to request to create the group, and after receiving the message, the first AF network element sends the group creation request to the NEF network element.

It should be noted that the group creation request needs to include an identifier of each UE in the group. A type of the identifier of the UE is not limited in this application. For example, the identifier of the UE may be a subscription permanent identifier (SUPI) of the UE, or may be a generic public subscription identifier (GPSI) of the UE, or may be an IP multimedia private identity (IMPI) of the UE, or may be an IP multimedia public identity (IMPU) of the UE, or may be another identifier. Any information that can be used to identify the UE is applicable to this embodiment of this application.

Step 202: The 5GLAN controller on the first network allocates a group identifier to the group, and the 5GLAN controller on the first network sends the group identifier to UE that is in the group and whose home network is the first network.

After receiving the group creation request, the 5GLAN controller on the first network may directly allocate the group identifier to the group, or may first determine whether a device that sends the group creation request has a permission to request to create the group, and allocate the group identifier to the group after determining that the device that sends the group creation request has the permission to request to create the group.

In a possible implementation, when receiving the group creation request that is from the first UE, the 5GLAN controller on the first network first determines whether the first UE has a permission to request to create the group, and the 5GLAN controller on the first network allocates the group identifier to the group after determining that the first UE has the permission to request to create the group.

There are many manners of determining whether the first UE has the permission to request to create the group, and three of the manners are listed below.

Manner 1: The 5GLAN controller on the first network may determine, by using locally stored information, whether the first UE has the permission to request to create the group. An example in which the locally stored information is an identifier of UE that has a permission to request to create the group is used for description. The 5GLAN controller on the first network may determine, by determining whether an identifier of the first UE is the identifier of the UE that has the permission to request to create the group, whether the first UE has the permission to request to create the group. A type of the locally stored information is not limited in this embodiment of this application. Any information that can be used to determine whether the first UE has the permission to request to create the group is applicable to this embodiment of this application.

Manner 2: The 5GLAN controller on the first network determines, by using a UDM network element on the first network, whether the first UE has the permission to request to create the group. The UDM network element on the first network may store an identifier of UE that has a permission to request to create the group. The 5GLAN controller on the first network may send a verification request to the UDM network element on the first network, where the verification request carries an identifier of the first UE, and is used to request to verify whether the first UE has the permission to request to create the group. The 5GLAN controller on the first network determines, based on response information of the UDM network element on the first network, that the first UE has the permission to request to create the group.

Manner 3: The 5GLAN controller on the first network determines, based on subscription data of the first UE, that the first UE has the permission to request to create the group. Specifically, authentication information of the first UE may be locally stored on the group management network element on the first network, or may be stored on the unified data management network element on the first network as a part of the subscription data of the first UE. The 5GLAN controller on the first network may obtain the authentication information in the subscription data of the first UE from the UDM network element on the first network. Then the 5GLAN controller on the first network determines, based on the authentication information of the first UE, that the first UE has the permission to request to create the group. For a specific implementation, refer to the embodiment shown in FIG. 3. Details are not described herein again.

The foregoing manners are merely examples for description. A manner of determining that the first UE has the permission to request to create the group is not limited in this application.

In another possible implementation, when the group creation request is from the first AF network element, the 5GLAN controller on the first network first determines whether the first application network element has a permission to request to create the group, and the 5GLAN controller on the first network allocates the group identifier to the group after determining that the first application network element has the permission to request to create the group.

There are many manners of determining whether the first AF network element has the permission to request to create the group. The 5GLAN controller on the first network may determine, by using the NEF network element, whether the first AF network element has the permission to request to create the group. For example, the NEF network element may store information such as an identifier of a device that has a permission to request to create the group. The NEF network element may determine, based on an identifier of the first AF network element, that the first AF network element has the permission to request to create the group, and send the group creation request to the 5GLAN controller, otherwise, the NEF network element rejects the group creation request. Alternatively, the 5GLAN controller on the first network may determine, based on locally stored information, whether the first AF network element has the permission to request to create the group. A specific manner is similar to the manner of determining, by the 5GLAN controller on the first network based on the locally stored information, whether the first UE has the permission to request to create the group. For details, refer to the foregoing content. Details are not described herein again.

In a scenario in which a group needs to be created, to create the group in a unified and orderly manner, a permission to request to create the group may be exposed only to specific UE or a specific AF network element, that is, only some UEs or AF network elements can request to create the group, and can finally implement group creation. Even if another UE or AF network element can send a group creation request, because the another UE or AF network element does not have a permission to request to create the group, the group creation request of the another UE or AF network element is rejected.

Then the 5GLAN controller on the first network allocates the group identifier to the group. After allocating the group identifier to the group, the 5GLAN controller on the first network needs to notify the allocated group identifier to each UE in the group. Specifically, there are the following two cases.

Case 1: A home network of each UE in the group is the first network.

The 5GLAN controller on the first network sends the group identifier to each UE in the group.

Specifically, the 5GLAN controller on the first network directly sends the group identifier to the AMF network element, and then the AMF network element sends the group identifier to each UE in the group. In addition, the 5GLAN controller on the first network sends the group identifier and an identifier of each UE in the group to the UDM network element on the first network, and the UDM network element on the first network updates subscription data of corresponding UE based on the identifier of each UE. Specifically, subscription data of each UE includes the group identifier.

In another implementation, specifically, the 5GLAN controller on the first network may send the group identifier to each UE in the group by using the UDM network element on the first network. The 5GLAN controller on the first network may send the group identifier and an identifier of each UE in the group to the UDM network element on the first network, and the UDM network element on the first network updates the group identifier into subscription data of each UE in the group.

When the 5GLAN controller on the first network may send the group identifier to each UE in the group by using the UDM network element on the first network, the 5GLAN controller on the first network may send, to the UDM network element on the first network, a first message used to trigger sending the group identifier to UE that is in the group and whose home network is the first network, where the first message includes the group identifier and an identifier of the UE that is in the group and whose home network is the first network. For related descriptions of the first message, refer to descriptions in the embodiment shown in FIG. 3. Details are not described herein again.

Specifically, the UDM network element on the first network may send the group identifier in the following two manners.

Manner 1: For any UE that is in the group and that is registered with the first network, the UDM network element on the first network may add the group identifier to a subscription data update notification message, and send the subscription data update notification message to the UE. Specifically, the UDM network element on the first network may first send the subscription data update notification message to the AMF network element, and then the AMF network element sends the subscription data update notification message to the UE. In the foregoing manner, the UE that is in the group and that is registered with the first network may receive the group identifier by using the subscription data update notification message.

It should be noted that, if the UE that is in the group and that is registered with the first network is in an idle state, a paging procedure needs to be first initiated for the UE, and a subscription data update procedure is performed after the UE is paged.

Manner 2: For any UE that is in the group and that is not registered with the first network, in a registration procedure of the UE (for example, the UE sends a registration request to the AMF network element), after receiving a subscription data request that is from the AMF network element, the UDM network element on the first network sends subscription data of the UE to the AMF network element, where the subscription data of the UE includes the group identifier. The AMF network element sends the group identifier to the UE. In a possible implementation, the UE may send the registration request to the AMF network element by using a base station. After receiving the registration request that is from the UE, the AMF network element requests the subscription data of the UE (UE subscription data) from the UDM network element on the first network. The UDM network element on the first network sends the subscription data of the UE to the AMF network element, where the subscription data of the UE carries a group identifier of a group to which the UE belongs. The AMF network element returns a registration accept message to the UE by using the base station, where the registration accept message carries the group identifier of the group to which the UE belongs.

In the foregoing manner, the UE that is in the group and that is not registered with the first network may obtain the group identifier by using the subscription data during registration.

It should be noted that, in the foregoing examples, the group identifier is stored on the UDM network element on the first network as a part of the subscription data of each UE in the group. Actually, there are a plurality of manners of storing the group identifier by the UDM network element on the first network. For example, for the group, the UDM network element on the first network may separately maintain corresponding group subscription data, where the group subscription data may include information such as the group identifier of the group, and the identifier and a home network of each UE in the group. The UDM network element on the first network may associate the group subscription data with the subscription data of each UE in the group. The foregoing manners of storing information such as the group identifier and sending the group identifier to the UE are all examples, and are not limited in this embodiment of this application. Any manner in which the group identifier can be stored and the group identifier can be sent to the UE is applicable to this embodiment of this application.

Case 2: The group includes UE whose home network is a second network, and also includes UE whose home network is the first network.

The 5GLAN controller on the first network sends the group identifier to the UE that is in the group and whose home network is the first network. For a specific sending manner, refer to related descriptions in the case 1. Details are not described herein again.

In the case 2, the 5GLAN controller on the first network further needs to perform step 203.

Step 203: The 5GLAN controller on the first network may first determine a 5GLAN controller on the second network, and then send, to the 5GLAN controller on the second network, the group identifier and an identifier of the UE that is in the group and whose home network is the second network.

When home networks of UEs in the group are different networks, the 5GLAN controller on the first network needs to determine a 5GLAN controller on a home network of each UE.

Specifically, the 5GLAN controller on the first network may determine the 5GLAN controller on the home network of each UE by itself, or the 5GLAN controller on the first network may determine the 5GLAN controller on the home network of each UE by using the AMF network element. The following describes these two manners.

1. When determining the 5GLAN controller on the home network of each UE by itself, the 5GLAN controller on the first network first determines the home network of each UE.

For example, an identifier of each UE may include home network information of the UE. For example, the identifier of the UE may include a country code and an operator code. The 5GLAN controller on the first network may further determine the home network by using the country code and the operator code. Actually, there are many manners of determining the home network by the 5GLAN controller on the first network. The foregoing is merely an example for description. A manner of determining the home network is not limited in this application.

Then the 5GLAN controller on the first network determines the 5GLAN controller on each home network.

For example, the 5GLAN controller on each home network may be set in advance. To be specific, home networks may communicate and negotiate with each other, to determine a default 5GLAN controller on each home network, information about the default 5GLAN controllers on the home networks may be summarized into list information, and the list information is stored on the 5GLAN controller on each home network. After determining the home network of each UE, the 5GLAN controller on the first network may determine the 5GLAN controller on each home network based on the stored list information. For another example, the list information obtained by summarizing the information about the default 5GLAN controllers on the home networks may be alternatively stored on a specific network element or function entity, for example, a server. After determining the home network of each UE, the 5GLAN controller on the first network may query the specific network element or functional entity. In a specific implementation, there are many manners of determining, by the 5GLAN controller on the first network, the 5GLAN controller on each home network. Any manner in which the 5GLAN controller on each home network can be determined is applicable to this embodiment of this application.

In another implementation, the 5GLAN controller on the first network may alternatively determine to query a specific network element or server, for example, a DNS or an NRF, for the 5GLAN controller on the second network.

2. The 5GLAN controller on the first network determines the 5GLAN controller on the home network of each UE by using the AMF network element.

When receiving the group creation request, the AMF network element may first determine the home network of each UE in the group. For UE whose home network is not the first network, the AMF network element determines a 5GLAN controller on a home network other than the first network. Then the AMF network element may send related information (for example, identification information, routing information, or address information, which is not limited in this application) of the 5GLAN controller on the home network other than the first network to the 5GLAN controller on the first network. For a manner of determining, by the AMF network element, the home network of each UE in the group and the 5GLAN controller on each home network, refer to the manner of determining, by the 5GLAN controller on the first network, the home network of each UE and the 5GLAN controller on each home network in the manner 1. Details are not described herein again.

After receiving the group identifier and the identifier of the UE that is in the group and whose home network is the second network, the 5GLAN controller on the second network may send, based on the identifier of the UE that is in the group and whose home network is the second network, the group identifier to the UE that is in the group and whose home network is the second network.

Specifically, the 5GLAN controller on the second network directly sends the group identifier to an AMF network element on the second network, and then the AMF network element on the second network sends the group identifier to each UE that is in the group and whose home network is the second network. In addition, the 5GLAN controller on the second network registers the group identifier with a UDM network element on the second network, so that the UDM network element on the second network separately updates subscription data of corresponding UE based on an identifier of each UE. Specifically, subscription data of each UE includes the group identifier.

In another implementation, specifically, the 5GLAN controller on the second network may send, by using the UDM network element on the second network, the group identifier to the UE that is in the group and whose home network is the second network. The group identifier may be sent in the following two manners.

Manner 1: For UE that is in the group and that is registered with the second network, the 5GLAN controller on the second network may send the group identifier in a same manner as the manner 1 of sending the group identifier by the 5GLAN controller on the first network. For details, refer to the foregoing content. Details are not described herein again.

Manner 2: For UE that is in the group and that is not registered with the second network, the 5GLAN controller on the second network may send the group identifier in a same manner as the manner 2 of sending the group identifier by the 5GLAN controller on the first network. For details, refer to the foregoing content. Details are not described herein again.

It should be understood that, in the foregoing embodiment, the second network is a network different from the first network, and may represent any home network other than the first network among the home networks of the UEs in the group. A quantity of home networks of the UEs in the group is not limited in this application either. For any home network other than the first network, for a manner of determining, by the 5GLAN controller on the first network, a 5GLAN controller on the home network and sending the group identifier and an identifier of UE that is in the group and that is on the home network to the 5GLAN controller on the home network, refer to the manner of determining, by the 5GLAN controller on the first network, the 5GLAN controller on the second network and sending the group identifier and the identifier of the UE that is in the group and whose home network is the second network to the 5GLAN controller on the second network.

Figure 3:
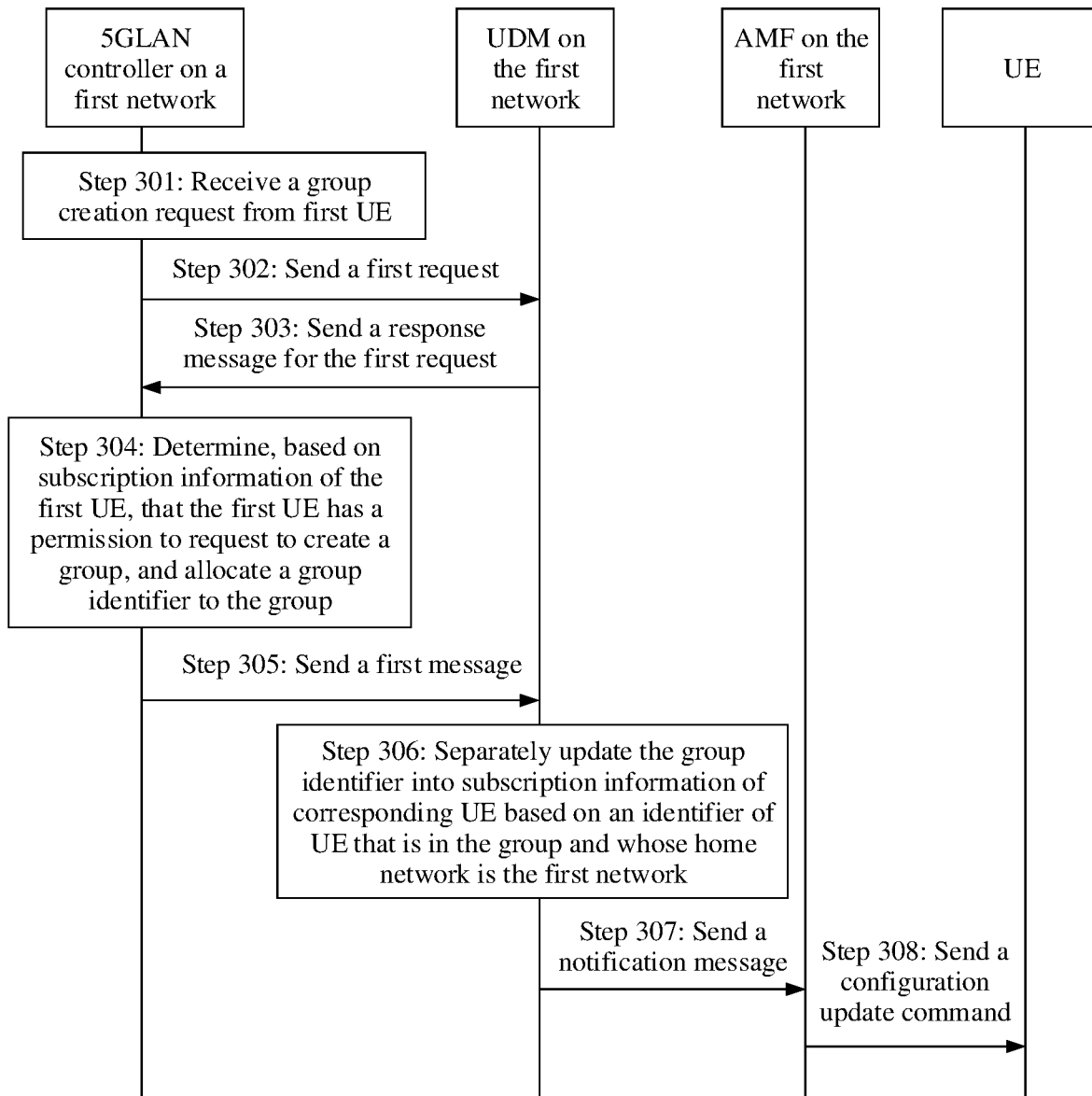
FIG. 3 is a schematic diagram of a group creation method according to this application.

Based on the network frameworks shown in FIG. 1A and FIG. 1B, this application provides a group creation method. The method is applied to a scenario in which the first UE sends a group creation request. As shown in FIG. 3, an example in which a unified data management network element on the first network is a UDM network element on the first network, the group management network element is a 5GLAN controller, and a terminal device is UE is used for description. A specific process is as follows.

Step 301: A 5GLAN controller on the first network receives the group creation request that is from the first UE, where the group creation request is used to request to create a group for performing local area network communication, and the group creation request includes an identifier of each terminal device in the group.

Step 302: After receiving the group creation request that is from the first UE, the 5GLAN controller on the first network sends, to the UDM network element on the first network, a first request used to request authentication information of the first UE.

Step 303: After receiving the first request, the UDM network element on the first network determines the authentication information of the first UE, and sends a response message for the first request to the 5GLAN controller on the first network.

The response message for the first request includes the authentication information of the first UE, and the authentication information includes information used to indicate that the first UE has a permission to request to create the group.

Specifically, the first request may carry an identifier of the first UE. After receiving the first request, the UDM network element on the first network may determine the authentication information of the first UE based on the identifier of the first UE, and add the authentication information of the first UE to the response message for the first request.

The authentication information of the first UE needs to include information used to indicate whether the first UE has the permission to request to create the group. An information type and an indication manner of the information used to indicate that the first UE has the permission to request to create the group are not limited in this application. For example, the authentication information of the first UE may include a specific field used to indicate that the first UE has the permission to request to create the group. The specific field may be preconfigured in subscription data of the first UE. The foregoing manner is merely an example for description. Any information that can indicate that the first UE has the permission to request to create the group is applicable to this embodiment of this application.

It should be understood that the authentication information of the first UE may be data in the subscription data of the first UE. After receiving the first request, the UDM network element on the first network may determine the authentication information of the first UE in the subscription data, and then add the authentication information of the first UE to the response message for the first request.

Step 304: After receiving the response message for the first request, the 5GLAN controller on the first network may determine, based on the authentication information of the first UE, that the first UE has the permission to request to create the group, and allocate a group identifier to the group.

After receiving the response message for the first request, the 5GLAN controller on the first network may obtain the authentication information of the first UE, and further obtain the information that is included in the authentication information of the first UE and that is used to indicate that the first UE has the permission to request to create the group.

After determining that the first UE has the permission to request to create the group, the 5GLAN controller on the first network may allocate the group identifier to the group. After allocating the group identifier, the 5GLAN controller on the first network needs to store the group identifier. For UE that is in the group and whose home network is the first network, the 5GLAN controller on the first network may perform step 305.

Step 305: The 5GLAN controller on the first network sends, to the UDM network element on the first network, a first message used to trigger sending the group identifier to the UE that is in the group and whose home network is the first network, where the first message includes the group identifier and an identifier of the UE that is in the group and whose home network is the first network.

It should be noted that a manner of triggering, by the first message, sending the group identifier to the UE that is in the group and whose home network is the first network is not limited in this application. For example, the first message may be used to indicate a manner of storing the group identifier. For example, the first message may include an information element used to indicate to store the group identifier. After receiving the first message including the information element, the UDM network element on the first network determines that the group identifier needs to be stored. When updating the group identifier into subscription data of the UE that is in the group and whose home network is the first network, the UDM network element on the first network is triggered to send a subscription data update notification message to an AMF network element, where the subscription data update notification message carries the group identifier. For another example, a message type of the first message may be used for indication. To be specific, the message type of the first message is a message type that instructs to store the group identifier, and provided that the UDM network element on the first network receives the first message of this type, the UDM network element on the first network may determine that the group identifier needs to be stored. The foregoing two manners are merely examples for description. Certainly, an information element may be alternatively added to the first message, to indicate the UDM network element on the first network to send the group identifier to the UE that is in the group and whose home network is the first network. Actually, any manner in which the UDM network element on the first network can be triggered by the first message to send the group identifier to the UE that is in the group and whose home network is the first network is applicable to this embodiment of this application.

Step 306: After receiving the first message, the UDM network element on the first network may separately update the group identifier into subscription data of corresponding UE based on the identifier of the UE that is in the group and whose home network is the first network.

The UDM network element on the first network may store subscription data of each UE on the first network. After receiving the first message, the UDM network element on the first network may learn that some UEs on the first network belong to the group and the 5GLAN controller on the first network has allocated the group identifier. The UDM network element on the first network may update the group identifier into subscription data of each UE that is in the group and whose home network is the first network.

When subscription data of the first UE that is stored on the UDM network element on the first network is updated, the UDM network element on the first network notifies the AMF network element of which subscription data of the first UE is updated, for example, notifies the AMF network element by using an Nudm_SDM_UpdateNotification message.

Step 307: The UDM network element on the first network sends a notification message to the AMF network element on the first network, where the notification message includes the group identifier and the identifier of the UE that is in the group and whose home network is the first network.

Step 308: The AMF network element on the first network receives the notification message sent by the UDM network element on the first network, and sends a configuration update command to the UE that is in the group and whose home network is the first network, where the configuration update command includes the group identifier.

It should be noted that, when the group includes a plurality of UEs whose home networks are the first network, the AMF network element needs to separately send configuration update commands to the plurality of UEs, so that each UE can learn of a group to which the UE belongs.

For a manner of sending, by the UDM network element on the first network, the group identifier to the corresponding UE based on the identifier of the UE that is in the group and whose home network is the first network, refer to the manner of sending, by the 5GLAN controller on the first network, the group identifier to each UE in the group by using the UDM network element on the first network in step 202. Details are not described herein again.

It should be understood that step 301 to step 304 are a method for determining, by the 5GLAN controller on the first network, that the first UE has the permission to request to create the group, and step 305 to step 307 are a method for sending, by the 5GLAN controller on the first network, the group identifier by using the UDM network element on the first network. For ease of description, the two methods are described in one embodiment of this application. Actually, the two methods are independent of each other and may be separately implemented. In a specific implementation process, based on an application scenario, one of the two methods may be selected and performed, or both the two methods may be selected and performed. This is not limited in this application. In addition, in FIG. 2 and FIG. 3, the first UE may be any UE in the group, or may not be UE in the group, but only act as an initiator of the group creation request to assist in creating the group. An attribute of the first UE is not limited in this application.

The following further describes the group creation method shown in FIG. 2 by using a specific embodiment.

Figure 4:
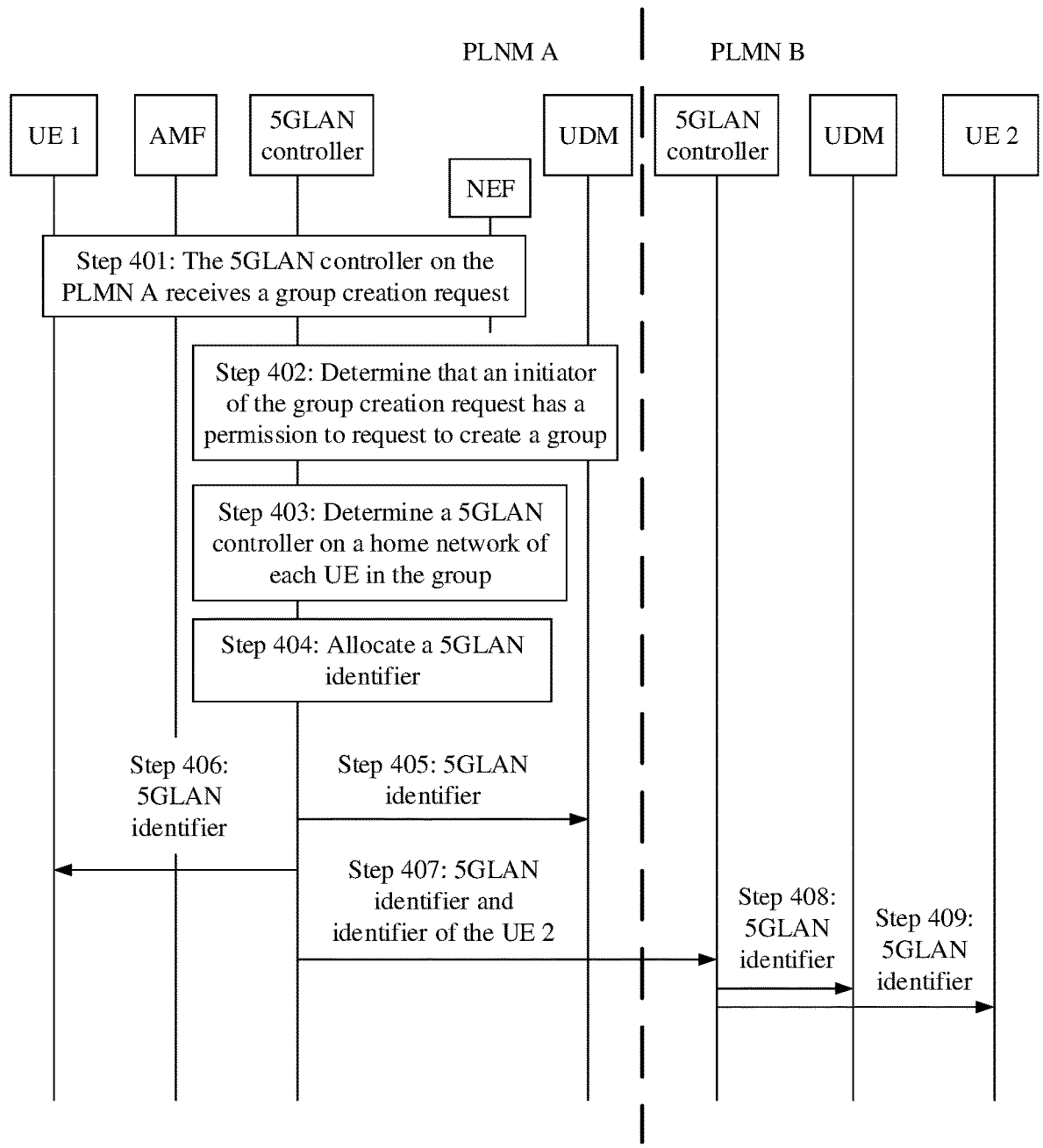
FIG. 4 is a flowchart of a group creation method according to this application.

FIG. 4 shows a group creation method according to an embodiment of this application, where a first network is a PLMN A, a second network is a PLMN B, a terminal device that is in a group and whose home network is the first network is UE 1, a terminal device that is in the group and whose home network is the second network is UE 2, a first application network element is an AF network element, and a group identifier is a 5GLAN identifier.

It should be understood that a quantity of UEs that are in the group and whose home networks are the first network and a quantity of UEs that are in the group and whose home networks are the second network are not limited in this embodiment of this application. In the embodiment shown in FIG. 4, only one UE 1 and one UE 2 are used as examples for description. Actually, when there are a plurality of UEs, one of the UEs may send a group creation request, and after the 5GLAN identifier is allocated, the 5GLAN identifier needs to be notified to each UE. Alternatively, a home network of UE in the group may be another PLMN. Because principles are similar, in this embodiment of this application, only the PLMN A and the PLMN B are used as examples for description.

Step 401: A 5GLAN controller on the PLMN A receives the group creation request, where the group creation request includes an identifier of each UE in the group.

Specifically, the following two receiving manners may be used.

1. The UE 1 sends the group creation request to a AMF network element, and the AMF network element forwards the group creation request to the 5GLAN controller on the PLMN A.

2. The AF network element sends the group creation request to the 5GLAN controller on the PLMN A by using the NEF network element.

Step 402: The 5GLAN controller on the PLMN A determines that an initiator of the group creation request has a permission to request to create the group.

When the group creation request is from the UE 1, the 5GLAN controller on the PLMN A needs to determine that the UE 1 has a permission to request to create the group.

When the group creation request is from the AF network element, it needs to be determined that the AF network element has a permission to request to create the group. For example, the 5GLAN controller on the PLMN A may determine that the AF network element has the permission to request to create the group, or the NEF network element may determine whether the AF network element has the permission to request to create the group. If the AF network element has the permission to request to create the group, the NEF network element sends the group creation request to the 5GLAN controller on the PLMN A. This may be understood as implicitly notifying the 5GLAN controller on the PLMN A that the AF network element has the permission to request to create the group. If the AF network element does not have the permission to request to create the group, the NEF network element rejects the request that is from the AF network element.

Step 403: The 5GLAN controller on the PLMN A determines a 5GLAN controller on a home network of each UE in the group.

Manner 1: The 5GLAN controller on the PLMN A first determines the home network of each UE in the group, and when determining that the group includes the UE 2 whose home network is the PLMN B, the 5GLAN controller on the PLMN A determines a 5GLAN controller on the PLMN B.

Manner 2: If the group creation request is forwarded by the AMF network element to the 5GLAN controller on the PLMN A, the 5GLAN controller on the PLMN A may determine, by using the AMF network element, the 5GLAN controller on the home network of each UE in the group. After receiving the group creation request, the AMF network element may determine the home network of each UE in the group. For the PLMN A, the AMF network element determines the 5GLAN controller on the PLMN A, to forward the group creation request to the 5GLAN controller on the PLMN A. For the PLMN B, when determining a 5GLAN controller on the PLMN B and sending the group creation request to the 5GLAN controller on the PLMN B, the AMF network element may also send related information of the determined 5GLAN controller on the PLMN B to the 5GLAN controller on the PLMN A. For example, the AMF network element may send address information of the determined 5GLAN controller on the PLMN B, or may send routing information of the determined 5GLAN controller on the PLMN B, or may send identification information of the 5GLAN controller on the PLMN B. This is not limited in this application. Any information that can enable the 5GLAN controller on the PLMN A to determine the 5GLAN controller on the PLMN B is applicable to this embodiment of this application.

Step 404: The 5GLAN controller on the PLMN A allocates the 5GLAN identifier.

Step 405: The 5GLAN controller on the PLMN A sends the 5GLAN identifier and an identifier of the UE 1 to a UDM network element on the PLMN A, and the UDM network element on the PLMN A updates subscription data of the UE 1, so that the UE 1 has subscription data of the 5GLAN identifier, and the UE 1 has a permission to use the 5GLAN identifier.

Step 406: The 5GLAN controller on the PLMN A sends the 5GLAN identifier to the UE 1.

Specifically, the 5GLAN controller on the PLMN A may send the 5GLAN identifier to the UE 1 by using the AMF network element, or may send the 5GLAN identifier by using the UDM network element on the PLMN A.

The UDM network element on the PLMN A sends the 5GLAN identifier to the UE 1. Specifically, the 5GLAN identifier may be sent in the following two manners.

Manner 1: If the UE 1 is registered, the UDM network element on the PLMN A sends the 5GLAN identifier to the UE 1 by using a UE configuration update procedure. The UDM network element on the PLMN A may add the 5GLAN identifier to a subscription data update notification message, and send the subscription data update notification message to the AMF network element. Then the AMF network element delivers the subscription data update notification message to the UE 1. If the UE 1 is in an idle state, a paging procedure needs to be first initiated for the UE 1, and then a subscription data update procedure is performed.

Manner 2: If the UE 1 is not registered, during registration of the UE 1, after receiving the group creation request that is from the UE 1, the UDM network element on the PLMN A sends the 5GLAN identifier to the UE 1. Specifically, when the UE 1 initiates a registration procedure, after receiving a subscription data request from the AMF network element, the UDM network element on the PLMN A sends subscription data to the AMF network element, where the subscription data includes the 5GLAN identifier. Then the AMF network element adds the 5GLAN identifier to a registration accept message, and sends the registration accept message to the UE 1.

Step 407: For the UE 2, the 5GLAN controller on the PLMN A sends the 5GLAN identifier and an identifier of the UE 2 to the 5GLAN controller on the PLMN B.

Step 408: The 5GLAN controller on the PLMN B sends the 5GLAN identifier and the identifier of the UE 2 to a UDM network element on the PLMN B.

Step 409: The 5GLAN controller on the PLMN B sends the 5GLAN identifier to the UE 2.

The process is similar to that of step 306. Refer to step 306. Details are not described herein again.

It should be noted that an execution sequence of step 405 to step 409 is not limited, and may be set based on a specific application scenario in a specific implementation.

Figure 5:
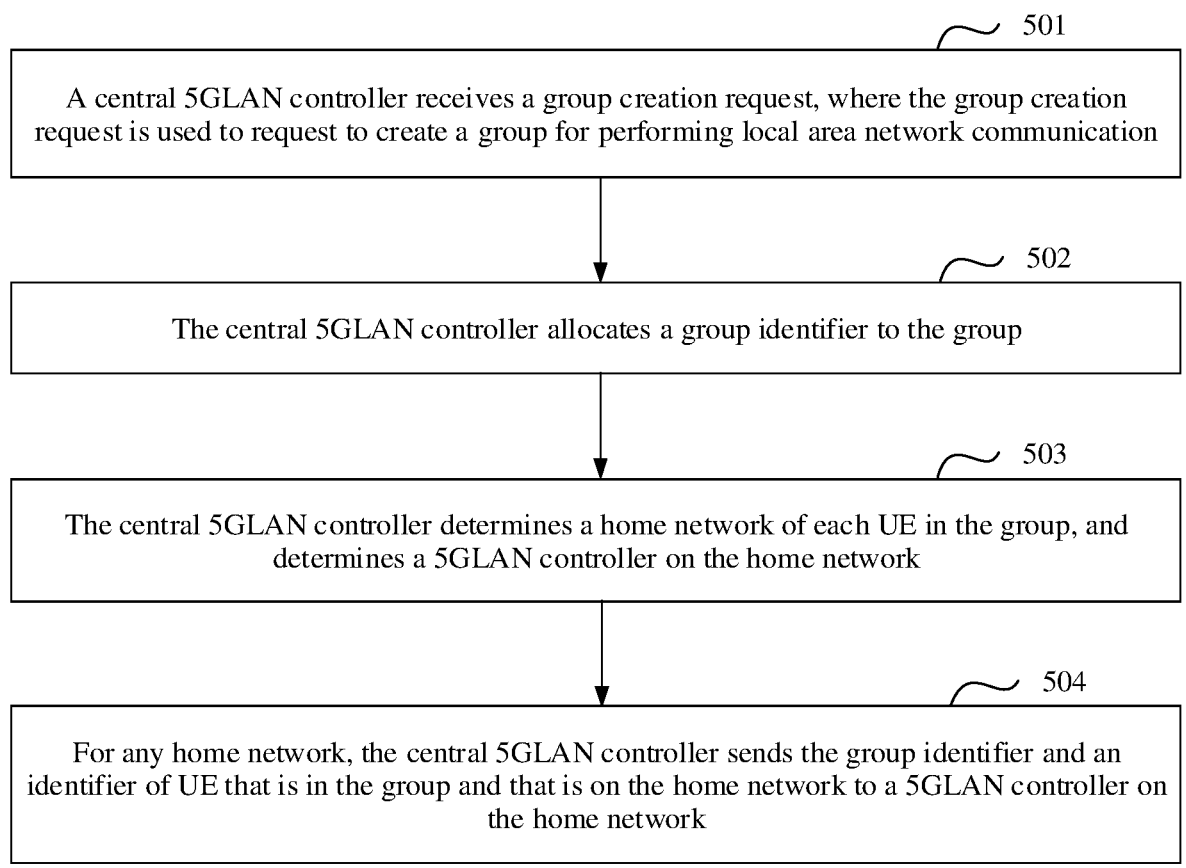
FIG. 5 is a schematic diagram of a group creation method according to this application.

Based on the network framework shown in FIG. 1C, this application provides a group creation method, where a global group management network element is a central 5GLAN controller, a terminal device is UE, a unified data management network element is a UDM network element, an access and mobility management network element is an AMF network element, and a first application network element is a first AF network element. As shown in FIG. 5, the method includes the following steps.

Step 501: The central 5GLAN controller receives a group creation request, where the group creation request is used to request to create a group for performing local area network communication, and the group creation request includes an identifier of each UE in the group.

In a possible implementation, the group creation request may be from a first UE. In other words, the first UE sends the group creation request to the central 5GLAN controller. For example, the first UE may send the group creation request by using an APP or a portal that is related to an application scenario, and then the group creation request is sent to the central 5GLAN controller.

In another possible implementation, the group creation request may alternatively be from the first AF network element. In other words, the first AF network element may send the group creation request to the central 5GLAN controller.

A manner of sending, by the first AF network element, the group creation request to the central 5GLAN controller is the same as the manner of sending, by the first AF network element, the group creation request to the 5GLAN controller on the first network in the embodiment shown in FIG. 2. For details, refer to the foregoing content. Details are not described herein again.

Step 502: The central 5GLAN controller allocates a group identifier to the group, where the group identifier is a 5GLAN identifier.

After receiving the group creation request, the central 5GLAN controller may directly allocate the group identifier to the group, or may first determine whether an initiator of the group creation request has a permission to request to create the group, and allocate the group identifier to the group after determining that the initiator of the group creation request has the permission to request to create the group.

In a possible implementation, when receiving the group creation request that is from the first UE, the central 5GLAN controller first determines whether the first UE has a permission to request to create the group, and the central 5GLAN controller allocates the group identifier to the group after determining that the first UE has the permission to request to create the group.

There are many manners of determining whether the first UE has the permission to request to create the group. For example, the central 5GLAN controller locally stores an identifier of UE that has a permission to request to create the group, and the central 5GLAN controller may determine, by determining whether an identifier of the first UE is the identifier of the UE that has the permission to request to create the group, whether the first UE has the permission to request to create the group. A type of information that is locally stored on the central 5GLAN controller and that is about the UE that has the permission to request to create the group is not limited in this application. The information may be an identifier, or may be other information. Any information that can be used to determine that the first UE has the permission to request to create the group is applicable to this embodiment of this application.

For another example, the information about the UE that has the permission to request to create the group may be alternatively stored on another network element or server. When the central 5GLAN controller needs to determine whether the first UE has the permission to request to create the group, the central 5GLAN controller may obtain the information about the UE that has the permission to request to create the group from the another network element or server, and then determine, based on the obtained information, that the first UE has the permission to request to create the group.

For another example, the central 5GLAN controller determines, based on authentication information of the first UE, that the first UE has the permission to request to create the group. In other words, the authentication information of the first UE includes the information used to indicate that the first UE has the permission to request to create the group. Specifically, the authentication information of the first UE belongs to subscription data of the first UE. An information type and an indication manner of the information used to indicate that the first UE has the permission to request to create the group are not limited in this application. For example, the authentication information of the first UE may include a specific field used to indicate that the first UE has the permission to request to create the group. The specific field may be preconfigured in the authentication information of the first UE. The foregoing manner is merely an example for description. Any information that can indicate that the first UE has the permission to request to create the group is applicable to this embodiment of this application.

When determining whether the first UE has the permission to request to create the group, the central 5GLAN controller may first obtain the authentication information of the first UE, and then determine, based on the authentication information of the first UE, that the first UE has the permission to request to create the group. There are many manners of obtaining, by the central 5GLAN controller, the authentication information of the first UE. For example, the central 5GLAN controller may locally store the authentication information of the first UE, or may obtain the authentication information in the subscription data of the first UE from a UDM network element on a home network of the first UE, or another manner may be used. This is not limited in this application.

The foregoing manners are merely examples for description. A manner of determining that the first UE has the permission to request to create the group is not limited in this application.

In another possible implementation, when receiving the group creation request that is from the first AF network element, the central 5GLAN controller first determines whether the first AF network element has a permission to request to create the group, and the central 5GLAN controller allocates the group identifier to the group after determining that the first AF network element has the permission to request to create the group.

There are many manners of determining whether the first AF network element has the permission to request to create the group. The central 5GLAN controller may determine, by using an NEF network element, whether the first AF network element has the permission to request to create the group. For example, the NEF network element may store information such as an identifier of a device that has a permission to request to create the group. The NEF network element may determine, based on an identifier of the first AF network element, that the first AF network element has the permission to request to create the group, and send the group creation request to the 5GLAN controller, otherwise, the NEF network element rejects the group creation request. The central 5GLAN controller may alternatively determine, based on locally stored information, whether the first AF network element has the permission to request to create the group. Actually, there are many manners of determining, by the central 5GLAN controller, whether the first AF network element has the permission to request to create the group. The foregoing methods are merely examples for description. This is not limited in this application.

Step 503: The central 5GLAN controller determines a home network of each UE in the group, and determines a 5GLAN controller on the home network.

After allocating the group identifier to the group, the central 5GLAN controller needs to notify the allocated group identifier to each UE in the group.

Specifically, the central 5GLAN controller may notify the group identifier to each UE in the group by using the 5GLAN controller on the home network of each UE in the group.

First, the central 5GLAN controller needs to first determine the home network of each UE in the group, and then the central 5GLAN controller determines the 5GLAN controller on each home network.

A method for determining, by the central 5GLAN controller, the home network and the 5GLAN controller on each home network is similar to the method for determining, by the 5GLAN controller on the first network itself, the 5GLAN controller on the home network of each UE in step 203. For details, refer to the foregoing content. Details are not described herein again.

Step 504: For any home network, the central 5GLAN controller sends the group identifier and an identifier of UE that is in the group and that is on the home network to a 5GLAN controller on the home network.

For any home network, after receiving, from the central 5GLAN controller, the group identifier and the identifier of the UE that is in the group and that is on the home network, the 5GLAN controller on the home network may send the group identifier to the UE that is in the group and that is on the home network based on the identifier of the UE that is in the group and that is on the home network.

The 5GLAN controller on the home network may send the group identifier to the UE that is in the group and that is on the home network by using an AMF network element on the home network.

Alternatively, the 5GLAN controller on the home network may send the group identifier to the UE that is in the group and that is on the home network by using a UDM network element on the home network. Specifically, the group identifier may be sent in the following two manners.

Manner 1: For UE that is in the group and that is registered with the home network, a manner of sending the group identifier by the 5GLAN controller on the home network is similar to the manner 1 of sending the group identifier by the 5GLAN controller on the first network in the embodiment shown in FIG. 2. For details, refer to the foregoing content. Details are not described herein again.

Manner 2: For UE that is in the group and that is not registered with the home network, a manner of sending the group identifier by the 5GLAN controller on the home network is similar to the manner 2 of sending the group identifier by the 5GLAN controller on the first network in the embodiment shown in FIG. 2. For details, refer to the foregoing content. Details are not described herein again.

The following further describes the group creation method shown in FIG. 4 by using a specific embodiment.

Figure 6:
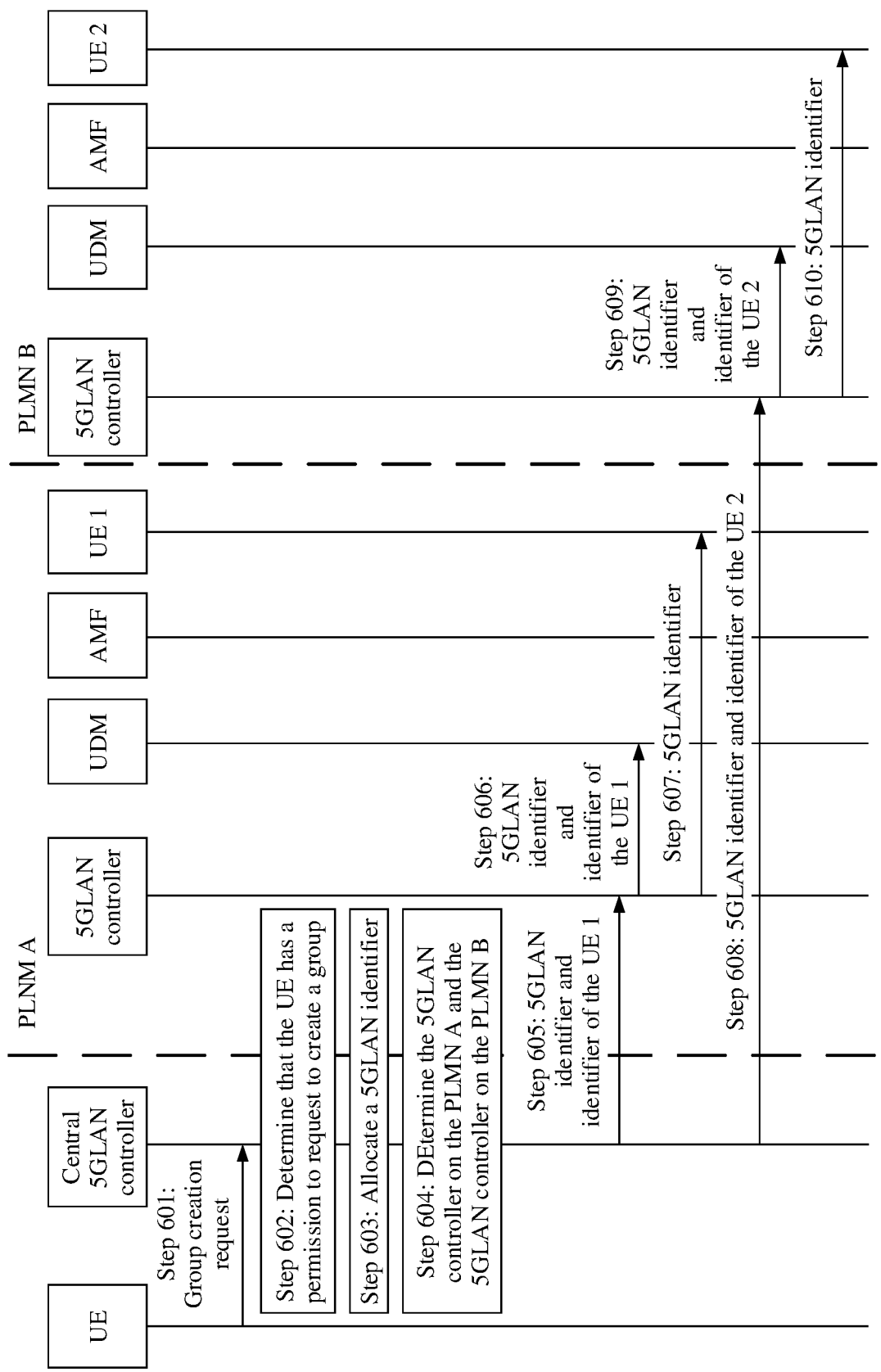
FIG. 6 is a flowchart of a group creation method according to this application.

FIG. 6 shows a group creation method according to an embodiment of this application, where a group includes UE whose home network is a PLMN A and UE whose home network is a PLMN B, a terminal device that is in the group and whose home network is a first network is UE 1, a terminal device that is in the group and whose home network is a second network is UE 2, and the group identifier is the 5GLAN identifier. It should be understood that a quantity of UEs that are in the group and whose home networks are the PLMN A and a quantity of UEs that are in the group and whose home networks are the PLMN B are not limited in this embodiment of this application. In the embodiment shown in FIG. 6, only one UE 1 and one UE 2 are used as examples for description. Actually, when the group includes a plurality of UEs whose home networks are the PLMN A, after the 5GLAN identifier is allocated, the 5GLAN identifier needs to be notified to each UE whose home network is the PLMN A. A case in which the group includes a plurality of UEs whose home networks are the PLMN B is the same. Details are not described herein again.

In FIG. 6, an example in which a central 5GLAN controller receives a group creation request that is from the UE 1 is used for description. It should be noted that a home network of UE in the group may be alternatively another PLMN. However, because principles are similar, in this embodiment of this application, only the PLMN A and the PLMN B are used as examples for description.

Step 601: The UE sends a group creation request to the central 5GLAN controller.

It should be noted that, as an initiator of the group creation request, the UE may be any UE in the group. For example, the UE may be the UE 1 or the UE 2. Alternatively, the UE may be UE that does not belong to the group, but only acts as an initiator of the group creation request to assist each UE in the group in creating the group. An attribute of the UE that sends the group creation request is not limited in this application. Any device that can send the group creation request is applicable to this embodiment of this application.

Optionally, the UE may send the group creation request to the central 5GLAN controller by using a portal or an APP.

Step 602: After receiving the group creation request, the central 5GLAN controller determines that the UE 1 has a permission to request to create the group.

In a possible implementation, the central 5GLAN controller may locally store information used to determine that the UE 1 has the permission to request to create the group, where the information may be an identifier of a device that has a permission to request to create the group, or may be other information. This is not limited in this application. The central 5GLAN controller may determine, based on the locally stored information, that the UE 1 has the permission to request to create the group.

Step 603: The central 5GLAN controller allocates the 5GLAN identifier.

Step 604: The central 5GLAN controller determines a home network of each UE in the group, and the central 5GLAN controller determines that the group includes the UE 1 whose home network is the PLMN A and the UE 2 whose home network is the PLMN B, and determines a 5GLAN controller on the PLMN A and a 5GLAN controller on the PLMN B.

For the PLMN A:

Step 605: The central 5GLAN controller sends the 5GLAN identifier and an identifier of the UE 1 to the 5GLAN controller on the PLMN A.

Step 606: The 5GLAN controller on the PLMN A sends the 5GLAN identifier and the identifier of the UE 1 to a UDM network element on the PLMN A, and the UDM network element on the PLMN A updates subscription data of the UE 1.

Step 607: The 5GLAN controller on the PLMN A sends the 5GLAN identifier to the UE 1.

The 5GLAN controller on the PLMN A may send the 5GLAN identifier to the UE 1 by using an AMF network element on the PLMN A.

Optionally, the 5GLAN controller on the PLMN A may alternatively send the 5GLAN identifier to the UE 1 by using a UDM network element on the PLMN A. For example, the 5GLAN controller on the PLMN A stores the 5GLAN identifier into subscription data that is of related UE and that is on the UDM network element on the PLMN A, and then the UDM network element on the PLMN A sends the 5GLAN identifier to the UE 1 by using the AMF network element on the PLMN A. Specifically, the 5GLAN identifier may be sent in the following two manners.

If the UE 1 is registered with the PLMN A, the UDM network element on the PLMN A sends a subscription data update notification message to the AMF network element on the PLMN A (because subscription data of the UE 1 changes, the UDM network element on the PLMN A is triggered to send the subscription data update notification message to the AMF network element on the PLMN A), where the subscription data update notification message carries the 5GLAN identifier. The AMF network element on the PLMN A sends the 5GLAN identifier to the UE 1 by using a UE configuration update procedure, that is, adds the 5GLAN identifier to a UE configuration update command and sends the UE configuration update command to the UE 1. Optionally, if the UE 1 is in an idle state, a paging procedure needs to be first initiated for the UE 1.

If the UE 1 is not registered with the PLMN A, when the UE 1 initiates a registration procedure, the UDM network element on the PLMN A sends the 5GLAN identifier to the UE 1. Specifically, after receiving a registration request that is from the UE 1, the AMF network element on the PLMN A requests subscription data of the UE 1 from the UDM network element on the PLMN A, and the UDM network element on the PLMN A sends the subscription data of the UE 1 to the AMF network element on the PLMN A, where the subscription data of the UE 1 includes the 5GLAN identifier. Then the AMF network element may send the 5GLAN identifier to the UE 1 in a registration accept message.

For the PLMN B:

Step 608: The central 5GLAN controller sends the 5GLAN identifier and an identifier of the UE 2 to the 5GLAN controller on the PLMN B.

Step 609: The 5GLAN controller on the PLMN B sends the 5GLAN identifier and the identifier of the UE 2 to a UDM network element on the PLMN B, and the UDM network element on the PLMN B updates subscription data of the UE 2.

Step 610: The 5GLAN controller on the PLMN B sends the 5GLAN identifier to the UE 2.

Specifically, a manner of sending, by the 5GLAN controller on the PLMN B, the 5GLAN identifier to the UE 2 is similar to the manner of sending, by the 5GLAN controller on the PLMN A, the 5GLAN identifier to the UE 1 in step 607. Details are not described herein again.

Figure 7:
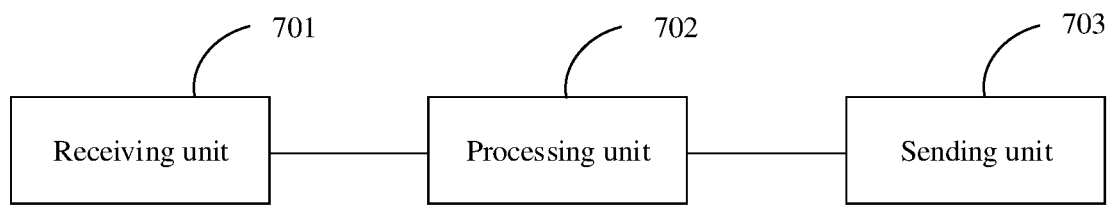
FIG. 7 to FIG. 10 are schematic structural diagrams of a communications apparatus according to this application.

Based on a same concept as the method embodiment, an embodiment of this application further provides a communications apparatus, configured to perform the method performed by the group management network element on the first network in the foregoing method embodiment. For related features, refer to the foregoing method embodiment. Details are not described herein again. As shown in FIG. 7, the apparatus includes a receiving unit 701, a processing unit 702, and a sending unit 703.

The receiving unit 701 is configured to receive a group creation request, where the group creation request is used to request to create a group for performing local area network communication, and the group creation request includes an identifier of each terminal device in the group.

The processing unit 702 is configured to allocate a group identifier to the group.

The sending unit 703 is configured to send the group identifier to a terminal device that is in the group and whose home network is the first network.

If the group includes a terminal device whose home network is a second network, the processing unit 702 is further configured to determine a group management network element on the second network.

The sending unit 703 is further configured to send the group identifier and an identifier of the terminal device that is in the group and whose home network is the second network to the group management network element on the second network.

Specifically, the receiving unit 701 may receive the group creation request in the following two manners.

Manner 1: The receiving unit 701 receives the group creation request that is from a first terminal device, where a home network of the first terminal device is the first network.

Manner 2: The receiving unit 701 receives the group creation request that is from a first application network element.

Before allocating the group identifier to the group, the processing unit 702 may further determine whether the first terminal device or the first application network element has a permission to request to create the group, and allocate the group identifier to the group after determining that the first terminal device or the first application network element has a permission to request to create the group.

In a possible implementation, there are many manners of determining, by the processing unit 702, that the first terminal device has the permission to request to create the group. For example, the processing unit 702 may determine, based on authentication information of the first terminal device, that the first terminal device has the permission to request to create the group. That is, the authentication information of the first terminal device includes information used to indicate that the first terminal device has the permission to request to create the group.

The authentication information of the first terminal device may be locally stored on the group management network element on the first network, or may be stored on a unified data management network element on the first network as a part of subscription data of the first terminal device. When the processing unit 702 needs to determine that the first terminal device has the permission to request to create the group, the receiving unit 701 receives the authentication information of the first terminal device from the unified data management network element on the first network, and then the processing unit 702 determines, based on the received authentication information of the first terminal device, that the first terminal device has the permission to request to create the group.

Optionally, when receiving the group creation request that is from the first terminal device, the receiving unit 701 may receive, from an access and mobility management network element, the group creation request that is from the first terminal device. Specifically, when sending the group creation request, the first terminal device may first send the group creation request to the access and mobility management network element, and then the access and mobility management network element forwards the group creation request to the group management network element on the first network.

In a possible implementation, there are many methods for determining, by the processing unit 702, the group management network element on the second network, and the processing unit 702 may determine the group management network element on the second network based on locally stored information. The processing unit 702 may alternatively determine the group management network element on the second network by using the access and mobility management network element.

After allocating the group identifier, the processing unit 702 needs to store the group identifier, and the sending unit 703 needs to send the group identifier to the terminal device that is in the group and whose home network is the first network. The processing unit 702 may store the group identifier on the unified data management network element on the first network, and the sending unit 703 may further send the group identifier to the terminal device that is in the group and whose home network is the first network by using the unified data management network element on the first network.

When sending the group identifier to the terminal device that is in the group and whose home network is the first network by using the unified data management network element on the first network, the sending unit 703 may send, to the unified data management network element on the first network, a first message used to trigger sending the group identifier to the terminal device that is in the group and whose home network is the first network. The first message includes the group identifier and an identifier of the terminal device that is in the group and whose home network is the first network.

For example, the first message may be further used to indicate to store the group identifier.

Figure 8:
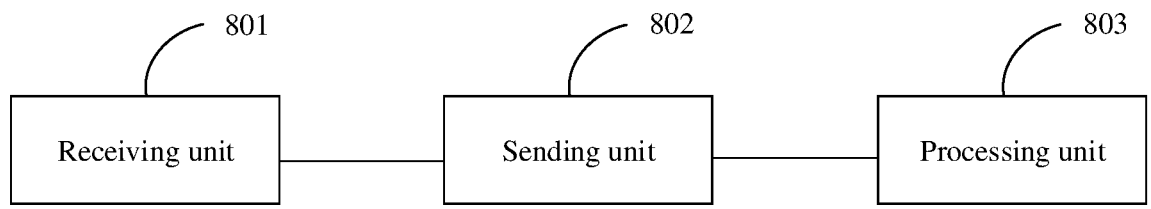

Based on a same concept as the method embodiment, an embodiment of this application further provides a communications apparatus, configured to perform the method performed by the unified data management network element on the first network in the foregoing method embodiment. For related features, refer to the foregoing method embodiment. Details are not described herein again. As shown in FIG. 8, the apparatus includes a receiving unit 801 and a sending unit 802.

The receiving unit 801 is configured to receive a first request that is from a group management network element on a first network and that is used to request authentication information of the first terminal device.

The sending unit 802 is configured to send a response message for the first request to the group management network element on the first network, where the response message for the first request includes the authentication information of the first terminal device, and the authentication information includes information used to indicate whether the first terminal device has a permission to request to create a group.

The communications apparatus further includes a processing unit 803, and the processing unit 803 may determine the authentication information of the first terminal device. Alternatively, the authentication information of the first terminal device may be stored on a unified data management network element on the first network as a part of subscription data of the first terminal device. The processing unit 803 may determine the authentication information of the first terminal device from the subscription data of the first terminal device.

Optionally, the receiving unit 801 may receive a first message that is from the group management network element on the first network and that is used to trigger sending the group identifier to a terminal device that is in the group and whose home network is the first network, where the first message includes the group identifier and an identifier of a terminal device that is in the group and whose home network is the first network. After the receiving unit 801 receives the first message, the processing unit 803 separately updates the group identifier into subscription data of a corresponding terminal device based on the identifier of the terminal device that is in the group and whose home network is the first network.

Optionally, the sending unit 802 may further send the group identifier to the corresponding terminal device based on the identifier of the terminal device that is in the group and whose home network is the first network.

When the sending unit 802 sends the group identifier to the corresponding terminal device based on the identifier of the terminal device that is in the group and whose home network is the first network, for any terminal device that is in the group and whose home network is the first network, there may be the following two cases depending on whether the terminal device is registered with the first network.

Case 1: If the terminal device is registered with the first network, the sending unit 802 sends the group identifier to an access and mobility management network element by using a subscription data update notification message.

Case 2: If the terminal device is not registered with the first network, in a registration process of the terminal device, the sending unit 802 sends the group identifier to an access and mobility management network element as a part of subscription data of the terminal device.

Figure 9:
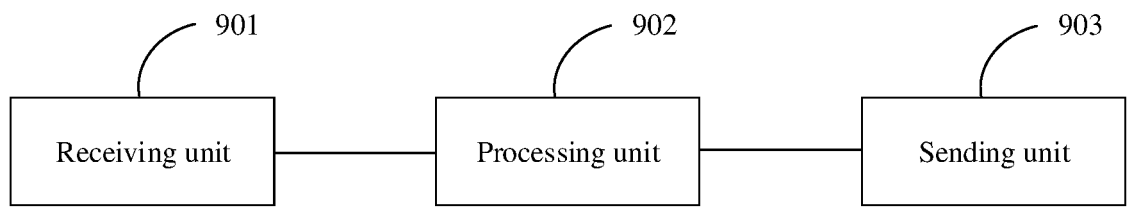

Based on a same inventive concept as the method embodiment, an embodiment of this application further provides a communications apparatus, configured to perform the method performed by the global group management network element in the foregoing method embodiment. For related features, refer to the foregoing method embodiment. Details are not described herein again. As shown in FIG. 9, the apparatus includes a receiving unit 901, a processing unit 902, and a sending unit 903.

The receiving unit 901 is configured to receive a group creation request, where the group creation request is used to request to create a group for performing local area network communication, and the group creation request includes an identifier of each terminal device in the group.

The processing unit 902 is configured to: allocate a group identifier to the group, determine a home network of each terminal device in the group, and determine a group management network element on the home network.

The sending unit 903 is configured to: for any home network, send the group identifier and an identifier of a terminal device that is in the group and that is on the home network to the group management network element on the home network.

Optionally, the group creation request may be from the first terminal device, or may be from a first application network element. The first terminal device may be any terminal device in the group, or may not be a terminal device in the group, but only act as an initiator of the group creation request.

Before allocating the group identifier to the group, the processing unit 902 may first determine whether the first terminal device or the first application network element has a permission to request to create the group, and allocate the group identifier after determining that the first terminal device or the first application network element has the permission to request to create the group.

There are many manners of determining, by the processing unit 902, that the first terminal device has the permission to request to create the group. For example, the processing unit 902 may determine, based on authentication information of the first terminal device, that the first terminal device has the permission to request to create the group. That is, the authentication information of the first terminal device includes information used to indicate that the first terminal device has the permission to request to create the group.

The authentication information of the first terminal device may be locally stored on the global group management network element, or may be stored on a unified data management network element as a part of subscription data of the first terminal device. When the processing unit 902 needs to determine that the first terminal device has the permission to request to create the group, the receiving unit 901 may receive the authentication information of the first terminal device from the unified data management network element, and then the processing unit 902 determines, based on the received authentication information of the first terminal device, that the first terminal device has the permission to request to create the group.

Division into units in the embodiments of this application is an example, is merely logical function division, and may be other division in actual implementation. In addition, functional units in the embodiments of this application may be integrated in one processor, or may exist alone physically, or two or more units are integrated into one module. The foregoing integrated unit may be implemented in a form of hardware, or may be implemented in a form of a software functional module.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a terminal device (which may be a personal computer, a mobile phone, a network device, or the like) or a processor to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

In this embodiment of this application, the group management network element on the first network, the unified data management network element on the first network, and the global group management network element may all be presented in a form of functional modules through division in an integrated manner. The "module" herein may be a specific ASIC, a circuit, a processor and a memory that execute one or more software or firmware programs, an integrated logic circuit, and/or another part that can provide the foregoing functions.

Figure 10:
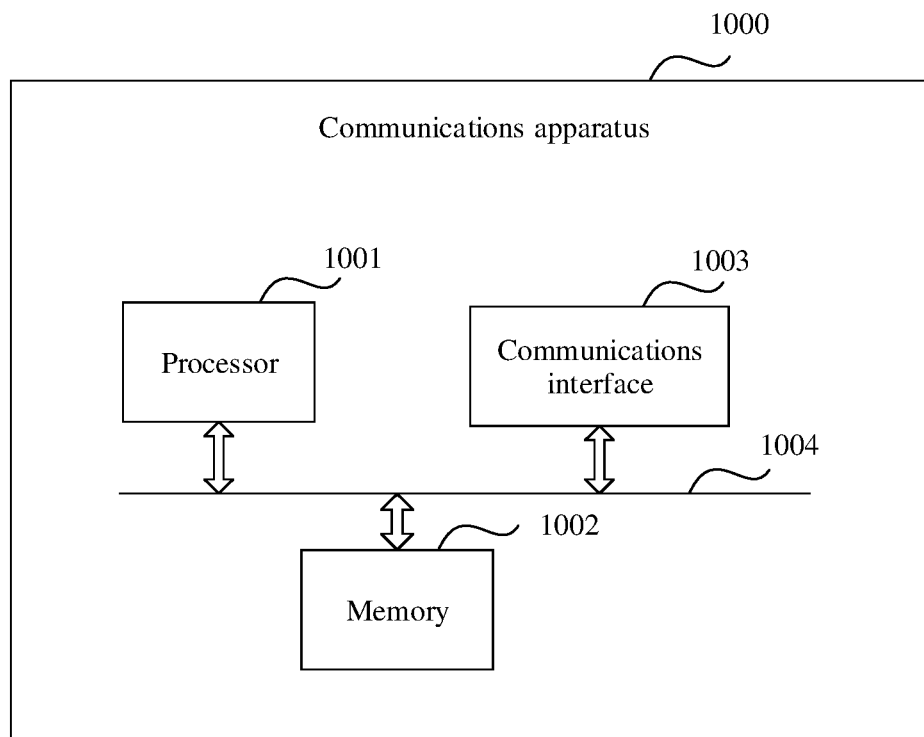

In a simple embodiment, a person skilled in the art may figure out that a access processing network element, a registration processing network element on the first network, and the first server may all use a form shown in FIG. 10.

The communications apparatus 1000 shown in FIG. 10 includes at least one processor 1001 and a memory 1002, and optionally, may further include a communications interface 1003.

The memory 1002 may be a volatile memory such as a random access memory. Alternatively, the memory may be a non-volatile memory such as a read-only memory, a flash memory, a hard disk drive (HDD), or a solid-state drive (SSD). Alternatively, the memory 1002 is any other medium that can be used to carry or store expected program code in a command or data structure form and that can be accessed by a computer. However, this is not limited. The memory 1002 may be a combination of the foregoing memories.

In this embodiment of this application, a specific connection medium between the processor 1001 and the memory 1002 is not limited. In this embodiment of this application, the memory 1002 is connected to the processor 1001 through a bus 1004 in the figure. The bus 1004 is represented by a thick line in the figure. A connection manner between other components is schematically described, and is not limited thereto. The bus 1004 may be classified into an address bus, a data bus, a control bus, and the like. For ease of representation, only one thick line is used to represent the bus in FIG. 10, but this does not mean that there is only one bus or only one type of bus.

The processor 1001 may have a data receiving and sending function, and can communicate with another device. In the apparatus shown in FIG. 10, an independent data receiving and sending module, for example, the communications interface 1003, may also be disposed and configured to receive and send data. When communicating with another device, the processor 1001 may perform data transmission through the communications interface 1003.

When the group management network element on the first network uses the form shown in FIG. 10, the processor 1001 in FIG. 10 may invoke the computer-executable instruction stored in the memory 1002, so that the group management network element on the first network can perform the method performed by the group management network element on the first network in any one of the foregoing method embodiments.

Specifically, functions/implementation processes of the sending unit, the receiving unit, and the processing unit in FIG. 7 may be implemented by the processor 1001 in FIG. 10 by invoking the computer-executable instruction stored in the memory 1002. Alternatively, functions/implementation processes of the processing unit in FIG. 7 may be implemented by the processor 1001 in FIG. 10 by invoking the computer-executable instruction stored in the memory 1002, and functions/implementation processes of the sending unit and the receiving unit in FIG. 7 may be implemented through the communications interface 1003 in FIG. 10.

When a unified data management network element on the first network uses the form shown in FIG. 10, the processor 1001 in FIG. 10 may invoke the computer-executable instruction stored in the memory 1002, so that the unified data management network element on the first network can perform the method performed by the unified data management network element on the first network in any one of the foregoing method embodiments.

Specifically, functions/implementation processes of the sending unit, the receiving unit, and the processing unit in FIG. 8 may be implemented by the processor 1001 in FIG. 10 by invoking the computer-executable instruction stored in the memory 1002. Alternatively, functions/implementation processes of the processing unit in FIG. 8 may be implemented by the processor 1001 in FIG. 10 by invoking the computer-executable instruction stored in the memory 1002, and functions/implementation processes of the sending unit and the receiving unit in FIG. 8 may be implemented through the communications interface 1003 in FIG. 10.

When the global group management network element uses the form shown in FIG. 10, the processor 1001 in FIG. 10 may invoke the computer-executable instruction stored in the memory 1002, so that the global group management network element may perform the method performed by the global group management network element in any one of the foregoing method embodiments.

Specifically, functions/implementation processes of the receiving unit, the sending unit, and the processing unit in FIG. 9 may be implemented by the processor 1001 in FIG. 10 by invoking the computer-executable instruction stored in the memory 1002. Alternatively, functions/implementation processes of the processing unit in FIG. 9 may be implemented by the processor 1001 in FIG. 10 by invoking the computer-executable instruction stored in the memory 1002, and functions/implementation processes of the receiving unit and the sending unit in FIG. 9 may be implemented through the communications interface 1003 in FIG. 10.

Based on a same inventive concept as the method embodiment, an embodiment of this application further provides a communications system, configured to perform the method in any one of the foregoing embodiments. For related features, refer to the foregoing method embodiment. Details are not described herein again.

Figure 11:
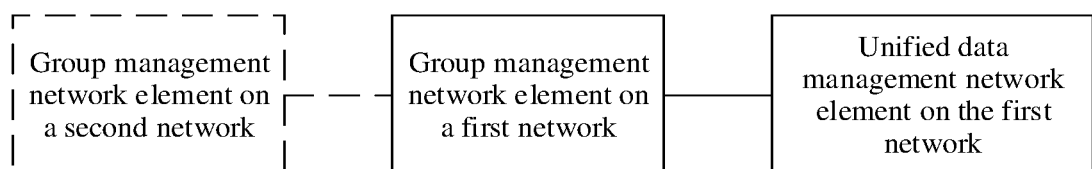
FIG. 11 is a schematic structural diagram of a communications system according to this application.

For a schematic structural diagram of the communications system provided in this embodiment of this application, refer to FIG. 11. Specifically, the communications system includes a group management network element on a first network and a unified data management network element on a first network.

The group management network element on the first network is configured to: after receiving a group creation request that is from a first terminal device, send, to the unified data management network element on the first network, a first request used to request authentication information of the first terminal device, where the group creation request is used to request to create a group for performing local area network communication, and the group creation request includes an identifier of each terminal device in the group.

The unified data management network element on the first network is configured to receive the first request, and send a response message for the first request to the group management network element on the first network, where the response message for the first request includes the authentication information of the first terminal device, and the authentication information includes information used to indicate whether the first terminal device has a permission to request to create the group.

The group management network element on the first network may further receive the response message for the first request, and determine, based on the authentication information of the first terminal device, that the first terminal device has the permission to request to create the group.

The group management network element on the first network may further allocate a group identifier to the group after determining that the first terminal device has the permission to request to create the group.

The group management network element on the first network may send, to the unified data management network element on the first network, a first message used to trigger sending the group identifier to the terminal device that is in the group and whose home network is the first network. The first message includes the group identifier and an identifier of the terminal device that is in the group and whose home network is the first network.

The unified data management network element on the first network first receives the first message, and after receiving the first message, separately updates the group identifier into subscription data of a corresponding terminal device based on the identifier of the terminal device that is in the group and whose home network is the first network.

In addition to indicating to store the group identifier, the first message may further indicate to send the group identifier to the terminal device that is in the group and whose home network is the first network.

After updating the subscription data of the corresponding terminal device, the unified data management network element on the first network needs to send the group identifier to the corresponding terminal device based on the identifier of the terminal device that is in the group and whose home network is the first network.

Specifically, when the unified data management network element on the first network sends the group identifier to the corresponding terminal device based on the identifier of the terminal device that is in the group and whose home network is the first network, for any terminal device that is in the group and whose home network is the first network, depending on whether the terminal device is registered with a corresponding home network, the group identifier may be sent in the following two manners.

Manner 1: If the terminal device is registered with the first network, the unified data management network element on the first network sends the group identifier to an access and mobility management network element by using a subscription data update notification message.

Manner 2: If the terminal device is not registered with the first network, in a registration process of the terminal device, the unified data management network element on the first network sends the group identifier to an access and mobility management network element as a part of subscription data of the terminal device.

Optionally, the communications system may further include a group management network element on a second network. If the group includes a terminal device whose home network is the second network, the group management network element on the first network may send the group identifier and an identifier of the terminal device that is in the group and whose home network is the second network to the group management network element on the second network. Then the group management network element on the second network receives the group identifier that is from the group management network element on the first network and the identifier of the terminal device that is in the group and whose home network is the second network, and may send the group identifier to the terminal device that is in the group and whose home network is the second network in the group.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A group creation method, comprising: receiving, by a first group management network element on a first network, a group creation request, wherein the group creation request requests creation of a group for performing local area network communication, and wherein the group creation request comprises an identifier of each terminal device in the group; allocating, by the first group management network element, a group identifier to the group; sending, by the first group management network element, the group identifier to a first terminal device that is in the group and whose home network is the first network; setting subscription data for the first terminal device to include the group identifier to indicate that the first terminal device has permission to use the group identifier; and sending, by the first group management network element, in response to the group having a second terminal device whose home network is a second network, the group identifier and an identifier of the second terminal device to a second group management network element on the second network.

2. The method according to claim 1, wherein the sending the group identifier to the first terminal device comprises: sending, by the first group management network element via a unified data management network element on the first network, the group identifier to the first terminal device.

3. The method according to claim 1, wherein the receiving the group creation request comprises: receiving, by the first group management network element, the group creation request from a third terminal device, wherein a home network of the third terminal device is the first network.

4. The method according to claim 3, further comprising performing, before the allocating the group identifier to the group: determining, by the first group management network element, that the third terminal device has permission to request to create the group.

5. The method according to claim 4, wherein the determining that the third terminal device has the permission to request to create the group comprises: determining, by the first group management network element, according to authentication information of the third terminal device, that the third terminal device has the permission to request to create the group.

6. The method according to claim 1, wherein the receiving the group creation request comprises: receiving, by the first group management network element, the group creation request from a first application network element.

7. The method according to claim 1, further comprising: determining, by the first group management network element, the second group management network element by performing at least one of: determining second group management network element information based on locally stored in the first group management network element; or determining the second group management network element information by querying a specific network element or server.

8. The method according to claim 1, wherein the group creation request is received from a source other than the first terminal device.

9. The method according to claim 1, wherein the first terminal device is part of the group.

10. A communications apparatus, comprising:
at least one processor; and
a non-transitory memory coupled to the at least one processor and storing program instructions to be executed by the at least one processor, the program instructions including instructions to:
receive a group creation request, wherein the group creation request requests creation of a group for performing local area network communication, and wherein the group creation request comprises an identifier of each terminal device in the group;
allocate a group identifier to the group;
set subscription data for a first terminal device to include the group identifier to indicate that the first terminal device has permission to use the group identifier;
send the group identifier to the first terminal device that is in the group and whose home network is a first network; and
send, in response to the group having a second terminal device whose home network is a second network, the group identifier and an identifier of the second terminal device to a second group management network element on the second network.

11. The communications apparatus according to claim 10, wherein the instructions to send the group identifier include instructions to: send, via a unified data management network element on the first network, the group identifier to the first terminal device.

12. The communications apparatus according to claim 10, wherein the instructions to receive the group creation request include instructions to: receive the group creation request from a third terminal device or a first application network element, wherein a home network of the third terminal device is the first network.

13. The communications apparatus according to claim 12, wherein the program instructions further include instructions to: determine that the third terminal device or the first application network element has permission to request to create the group.

* * * * *